US012763898B2

(12) United States Patent
Park et al.

(10) Patent No.: US 12,763,898 B2
(45) Date of Patent: Oct. 13, 2026

(54) METHODS, APPARATUS, AND SYSTEMS FOR DOWNLINK (DL) POWER ADJUSTMENT AND UE BEHAVIORS/PROCEDURES FOR CROSS DIVISION DUPLEX (XDD)

(71) Applicant: InterDigital Patent Holdings, Inc., Wilmington, DE (US)

(72) Inventors: Jonghyun Park, Syosset, NY (US); Moon Il Lee, Melville, NY (US); Paul Marinier, Brossard (CA); Young Woo Kwak, Woodbury, NY (US); Nazli Khan Beigi, Longueuil (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 236 days.

(21) Appl. No.: 18/706,773

(22) PCT Filed: Nov. 1, 2022

(86) PCT No.: PCT/US2022/048543
§ 371 (c)(1),
(2) Date: May 2, 2024

(87) PCT Pub. No.: WO2023/081133
PCT Pub. Date: May 11, 2023

(65) Prior Publication Data

US 2025/0038906 A1 Jan. 30, 2025

Related U.S. Application Data

(60) Provisional application No. 63/395,133, filed on Aug. 4, 2022, provisional application No. 63/275,114, filed on Nov. 3, 2021.

(51) Int. Cl.
*H04L 5/14* (2006.01)
*H04L 5/00* (2006.01)
*H04W 24/10* (2009.01)

(52) U.S. Cl.
CPC .............. *H04L 5/0048* (2013.01); *H04L 5/14* (2013.01); *H04W 24/10* (2013.01);
(Continued)

(58) Field of Classification Search
CPC ................................ H04L 12/28; H04L 12/50
(Continued)

(56) References Cited

U.S. PATENT DOCUMENTS 11,632,204 B2 * 4/2023 Marinier ................. H04L 5/001 370/329
11,889,338 B2 * 1/2024 Marinier ............. H04W 72/541
(Continued)

FOREIGN PATENT DOCUMENTS

| | | | |
|---|---|---|---|
| EP | 4009722 | A1 | 6/2022 |
| WO | WO 2021024325 | A1 | 2/2021 |
| WO | WO 2024018604 | A1 | 1/2024 |

OTHER PUBLICATIONS

Third Generation Partnership Project, "Technical Specification Group Radio Access Network; NR; Radio Resource Control (RRC) protocol specification (Release 16)," 3GPP TS 38.331 V16.5.0 (Jun. 2021), 969 pages.

(Continued)

*Primary Examiner* — Dang T Ton
(74) *Attorney, Agent, or Firm* — Majid Albassam

(57) ABSTRACT

Methods, apparatus and systems are disclosed. In one embodiment, a method may be implemented by a first Wireless Transmit/Receive Unit (WTRU). The method may include receiving configuration information indicating a first set of RBs for performing a CSI-RS measurement, receiving (Continued)

an indication indicating a second set of RBs, and receiving an indication indicating that a first set of symbols or slots is not configured for a certain type of duplexing method and a second set of symbols or slots is configured for the certain type of duplexing method. The method may also include measuring a first CSI-RS in the first set of RBs in a symbol or slot in the first set of symbols or slots, measuring a second CSI-RS in a symbol or slot of the second set of symbols or slots in RBs that are in both the first set of RBs and the second set of RBs, determining a CSI based on the measurement of the first CSI-RS and the second CSI-RS, and reporting the CSI.

21 Claims, 10 Drawing Sheets

(52) U.S. Cl.
CPC .......... *H04L 5/0041* (2013.01); *H04L 5/0057* (2013.01); *H04L 5/006* (2013.01)

(58) Field of Classification Search
USPC .......................... 370/329, 401, 402, 403, 405
See application file for complete search history.

(56) References Cited

U.S. PATENT DOCUMENTS

| | | | |
|---|---|---|---|
| 2016/0050575 | A1 | 2/2016 | Seo et al. |
| 2018/0019859 | A1 | 1/2018 | Cheng et al. |
| 2021/0083956 | A1 | 3/2021 | Fan et al. |
| 2021/0092627 | A1 | 3/2021 | Radulescu et al. |
| 2021/0273774 | A1 | 9/2021 | Abotabl et al. |
| 2021/0345158 | A1 | 11/2021 | Puente et al. |

OTHER PUBLICATIONS

3GPP TS 38.214 V16.6.0 (Jun. 2021), 3rd Generation Partnership Project; Technical Specification Group Radio Access Network; NR; Physical Layer Procedures for Control (Release 16), 172 pages.

3GPP TS 38.321 V16.5.0 (Jun. 2021), 3rd Generation Partnership Project; Technical Specification Group Radio Access Network; NR; Medium Access Control (MAC) protocol specification (Release 16), 76 pages.

3GPP TS 38.213 V16.6.0 (Jun. 2021), 3rd Generation Partnership Project; Technical Specification Group Radio Access Network; NR; Physical Layer Procedures for Control (Release 16), 187 pages.

3GPP TS 38.215 V16.4.0 (Dec. 2020), 3rd Generation Partnership Project; Technical Specification Group Radio Access Network; NR; Physical Layer Measurements (Release 16), 25 pages.

3GPP TS 38.212 V16.6.0 (Jun. 2021), 3rd Generation Partnership Project; Technical Specification Group Radio Access Network; NR; Multiplexing and channel coding (Release 16), 153 pages.

English Language Abstract, International Publication No. WO 2024018604 A1, published Jan. 25, 2024.

* cited by examiner

Table 11.1.1-1: Slot Formats for Normal Cyclic Prefix

| FORMAT | Symbol Number in a Slot | | | | | | | | | | D | D | D |
|---|---|---|---|---|---|---|---|---|---|---|---|---|---|
| | 0 | 1 | 2 | 3 | 4 | 5 | 6 | 7 | 8 | 9 | 10 | U 11 | U 12 | U 13 |
| 0 | D | D | D | D | D | D | D | D | D | D | D | F | F | F |
| 1 | U | U | U | U | U | U | U | U | U | U | U | D | D | F |
| 2 | F | F | F | F | F | F | F | F | F | F | F | D | F | F |
| 3 | D | D | D | D | D | D | D | D | D | D | D | | | |
| 4 | D | D | D | D | D | D | D | D | D | D | D | D | D | D |
| | | | | | | | | ---- | | | | D | D | D |
| 54 | F | F | F | F | F | F | F | D | D | D | D | | | |
| 55 | U | U | F | F | F | U | U | U | D | D | D | | | |
| 56 - 254 | Reserved | | | | | | | | | | | | | |
| 255 | UE Determine the Slot Format for the Slot based on tdd-UL-DL-ConfigurationCommon, or tdd-UL-DL-Configuration Dedicated and, if any, on Detected DCI Formats. | | | | | | | | | | | | | |

FIG. 2

METHODS, APPARATUS, AND SYSTEMS FOR DOWNLINK (DL) POWER ADJUSTMENT AND UE BEHAVIORS/PROCEDURES FOR CROSS DIVISION DUPLEX (XDD)

CROSS REFERENCE TO RELATED APPLICATIONS

This application is a U.S. National Stage Application under 35 U.S.C. 371 of International Patent Application No. PCT/US2022/048543, filed Nov. 1, 2022, which claims priority from U.S. Provisional Application No. 63/275,114, filed Nov. 3, 2021, and U.S. Provisional Application No. 63/395,133, filed on Aug. 4, 2022, which are incorporated herein by reference in their entirety.

FIELD

Embodiments disclosed herein generally relate to wireless communications and, for example to methods, apparatus and systems for DL power adjustment and UE behaviors/procedures for subband non-overlapping full duplex (SBFD) or XDD.

BRIEF DESCRIPTION OF THE DRAWINGS

A more detailed understanding may be had from the detailed description below, given by way of example in conjunction with drawings appended hereto. Figures in the description, are examples. As such, the Figures and the detailed description are not to be considered limiting, and other equally effective examples are possible and likely. Furthermore, like reference numerals in the figures indicate like elements, and wherein:

FIG. 2 is a table illustrating representative slot formats associated with a slot, according to an embodiment;

DETAILED DESCRIPTION

Example Networks for Implementation of the Embodiments

Figure 1A:
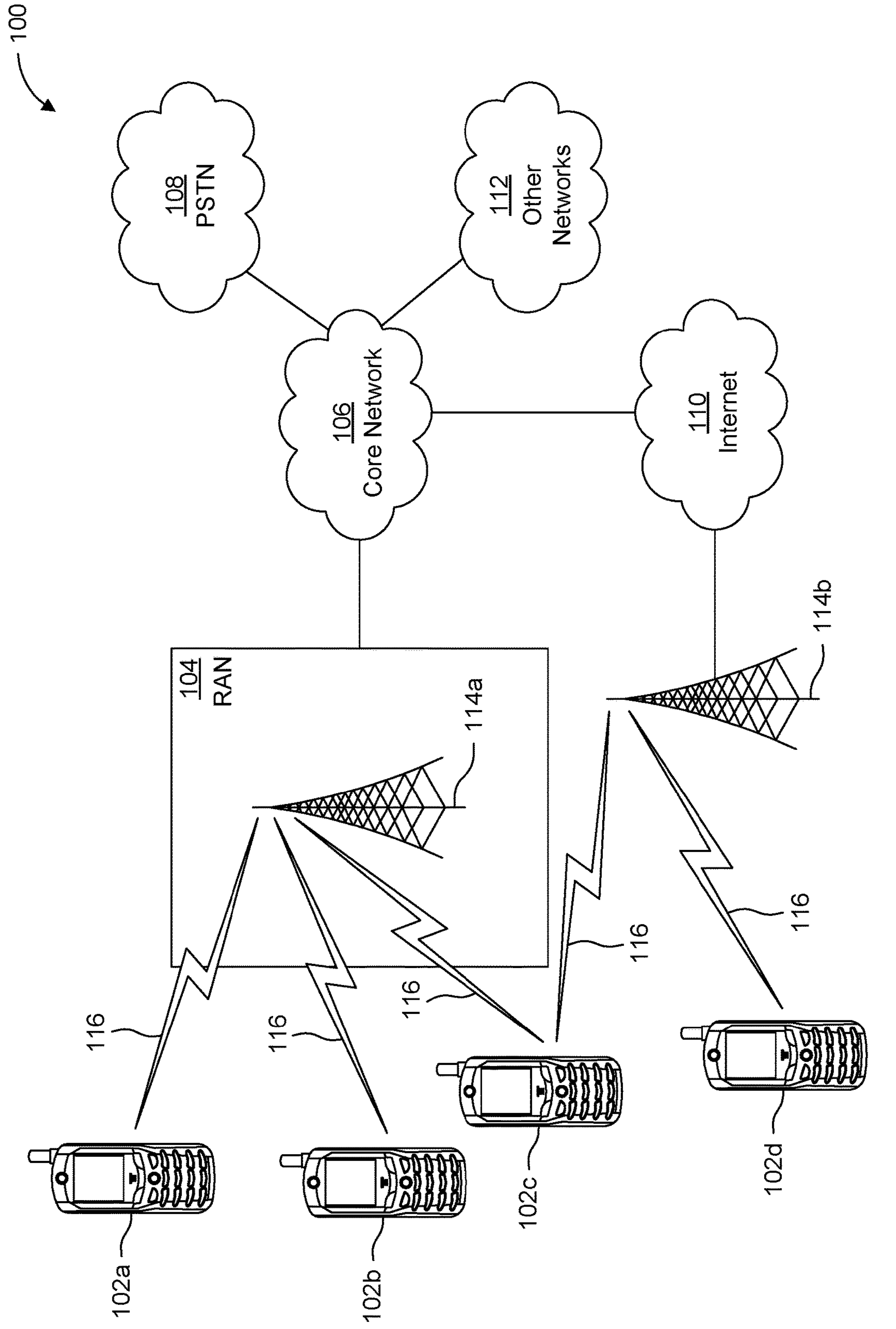
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B (end), a Home Node B (HNB), a Home eNode B (HeNB), a gNB, a NR Node B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
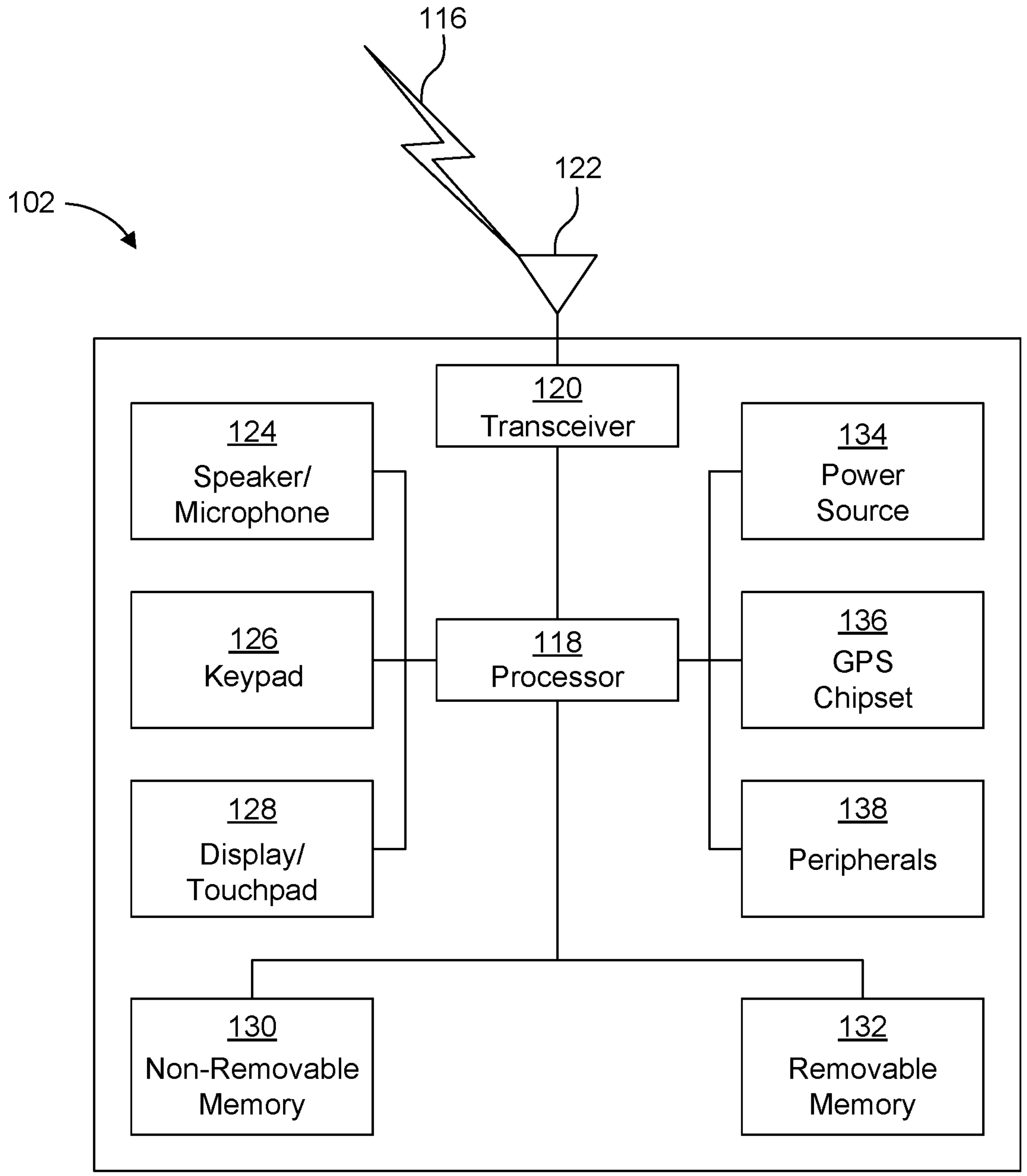
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The processor 118 of the WTRU 102 may operatively communicate with various peripherals 138 including, for example, any of: the one or more accelerometers, the one or more gyroscopes, the USB port, other communication interfaces/ports, the display and/or other visual/audio indicators to implement representative embodiments disclosed herein.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
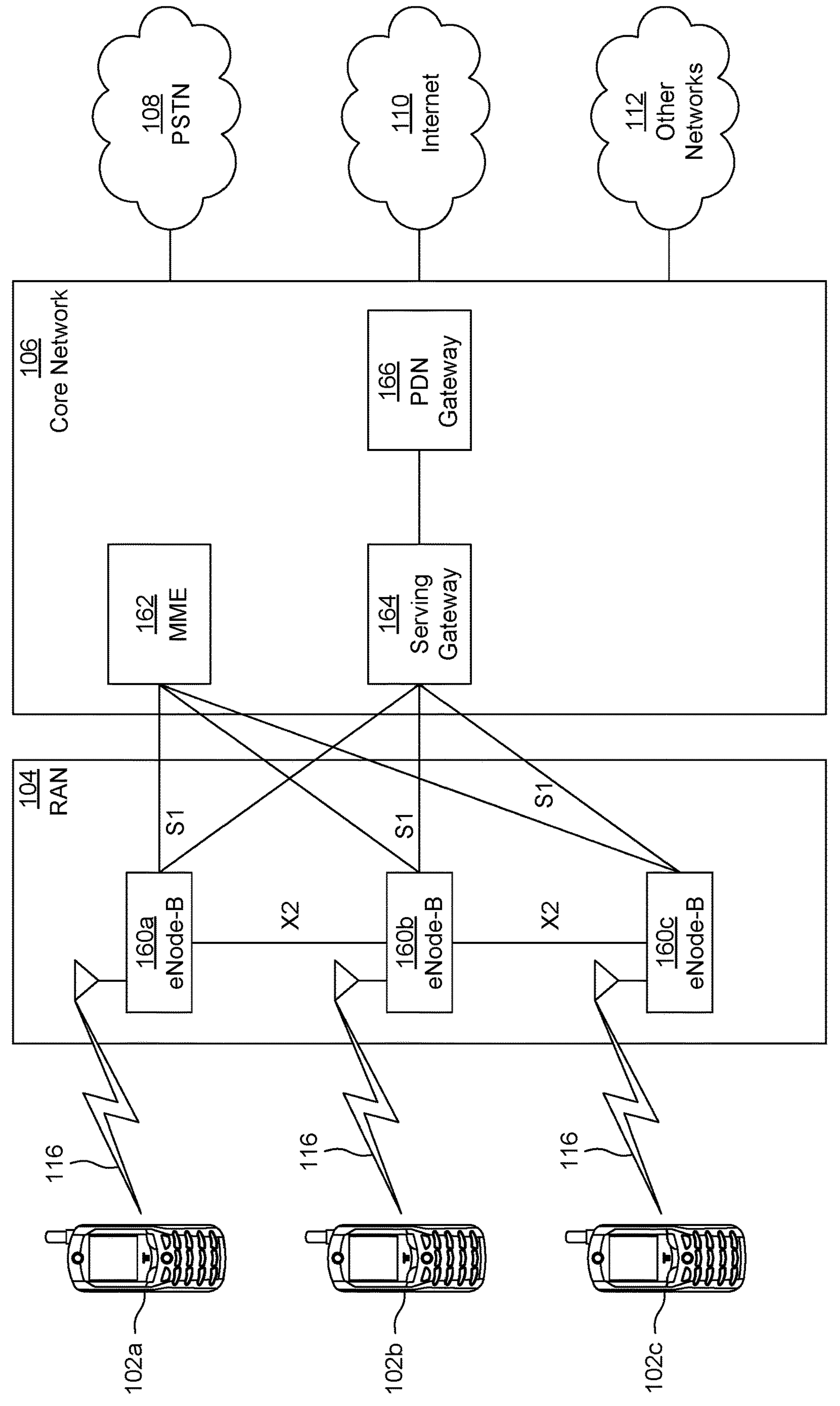
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and/or receive wireless signals from, the WTRU 102a.

Each of the eNode Bs 160a, 160b, 160c may be associated with a particular cell (not shown) and may be configured to handle radio resource management decisions, handover decisions, scheduling of users in the UL and/or DL, and the like. As shown in FIG. 1C, the eNode Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped onto the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
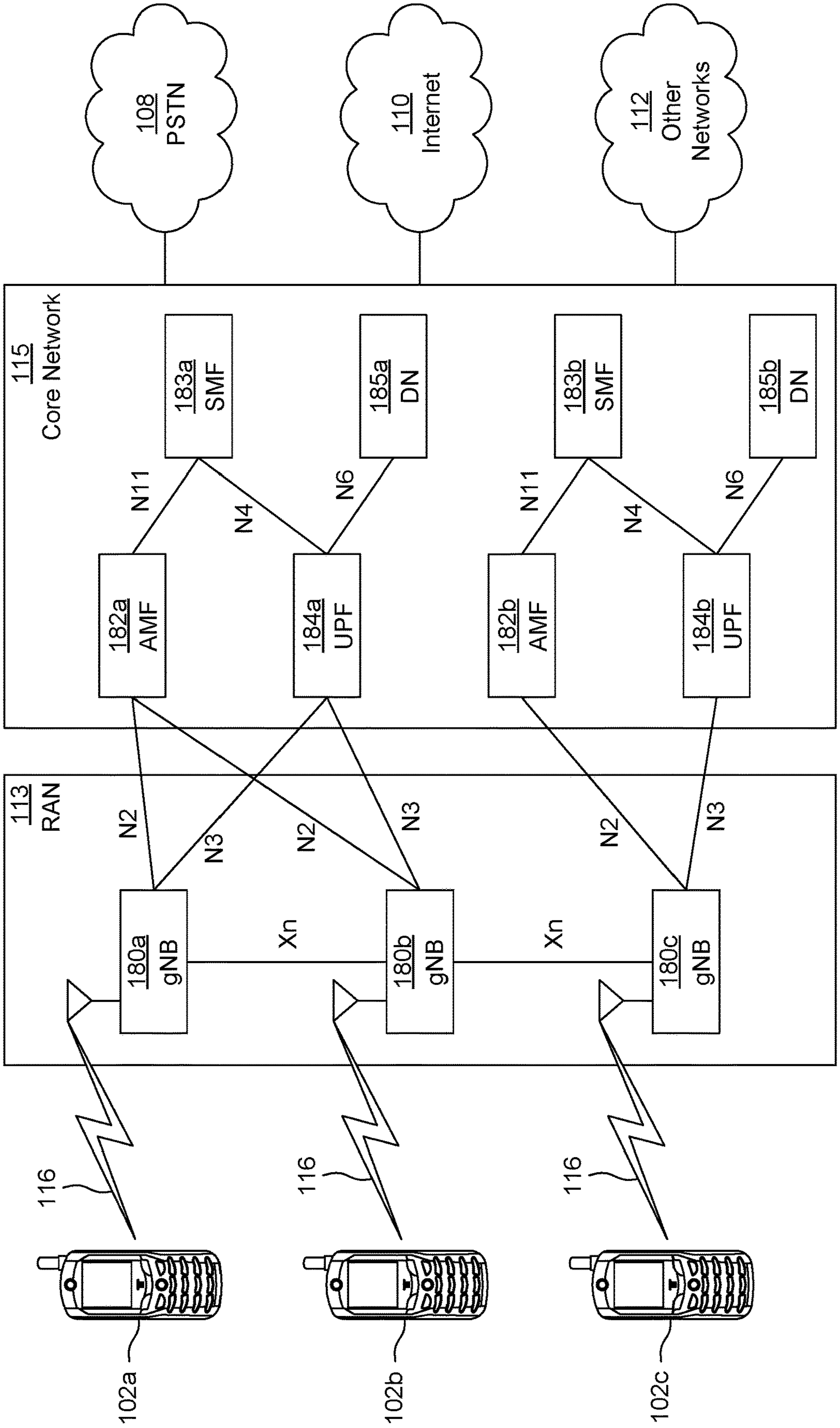
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 180*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode Bs 160*a*, 160*b*, 160*c*. For example, WTRUs 102*a*, 102*b*, 102*c* may implement DC principles to communicate with one or more gNBs 180*a*, 180*b*, 180*c* and one or more eNode Bs 160*a*, 160*b*, 160*c* substantially simultaneously. In the non-standalone configuration, eNode Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface. Any of the terms "gNB", "network entity" "base station" and/or "access point" may be used interchangeably.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements is depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different Protocol Data Unit (PDU) sessions with different requirements), selecting a particular SMF 183*a*, 183*b*, management of the registration area, termination of Non-Access Stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency communication (URLLC) access, services relying on enhanced mobile (e.g., massive mobile) broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A UE may be informed of a DL Power Adjustment (DPA), e.g., DL Power Back-Off (PBO), completed by a base station and/or gNB (due to self-interference by the XDD). The UE may apply and/or be configured to apply at least one of: (1) power-level compensation (e.g., to derive/determine CSI), (2) an automatic measurement restriction (MR)=ON for a symbol/slot, (3) skipping the behavior/procedure on/associated with one or more measurements, and/or (4) UE-triggered automatic gain control (AGC) adjustment, e.g., based on an indicated DPA.

Examples of the DPA to be informed include any of:

(1) an absolute amount of the DPA (e.g., in dB) that may be applied to a DL transmit (Tx) power on a non-XDD slot/symbol;

(2) an absolute amount of extra DPA (e.g., in dB) that may be applied to a scaled DL Tx power level by taking a ratio between a number of DL resource blocks (RBs) (e.g., one or more DL RBs) and (i) a number of UL RBs (e.g., one or more UL RBs) or (ii) non-DL RBs (e.g., one or more non-DL RBs, for example including "Flexible" RBs) into account for an XDD-slot/symbol;

(3) a ratio value/parameter associated with (e.g., on) an amount of the DPA that may be applied to a DL Tx power associated with (e.g., on) a non-XDD slot/symbol;

(4) a ratio value/parameter associated with (e.g., on) the amount of the extra DPA that may be applied to a scaled DL Tx power level by taking a resource-wise ratio between a number of DL RBs and the number of UL RBs and/or non-DL RBs (e.g., including "Flexible" RBs) into account for an XDD-slot/symbol; and/or, (5) whether the DPA is applicable per DL-RE or per group of REs (e.g., this may be, for example, combined with how many REs are allocated for the DL.

The UE may apply the power-level compensation (e.g., based on the DPA) on/for particular symbol/slot (e.g., indicated as an XDD-symbol/slot, e.g., by using a mixed UL/DL slot/symbol format), for example when measuring a periodic/semi-persistent Channel State information Reference Signal (CSI-RS). For example, the UE may compensate and/or be configured to compensate to change an amount of power, e.g., to reduce the amount of power, for example due to the DPA. The reduction may make the amount comparable to one or more other instances not being applied with the DPA. Then, the measurements may be averaged over the time-domain to derive a CSI.

The UE may apply a measurement restriction 'MR=ON' (e.g., a first MR mode) when a DPA is informed/applied. For example, the UE may apply the first MR mode (e.g., 'MR=ON') on (e.g., only on) an instance when the DPA indication is given/obtained (e.g., by Downlink Control information (DCI)), and after that, the UE may apply a second mode (e.g., 'MR=OFF'), for example by resetting a measurement averaging window.

The UE may apply a skipping operation/behavior on one or more measurements (e.g., based on the DPA) on/for particular symbol/slot (for example indicated as an XDD-symbol/slot, e.g., by a mixed UL/DL slot/symbol format) when measuring a periodic/semi-persistent CSI-RS. In some examples, the UE may perform measurement averaging and/or may be configured to perform the measurement averaging across, for example only across, multiple measurements in the time domain for which the DPA indication is not given/obtained.

The UE may apply an AGC adjustment (e.g., a UE-triggered AGC adjustment), when a DPA is informed/applied. For example, the UE may be configured with and/or have an indication of an AGC gap (e.g., a time-domain gap) value/parameter (for example, based on XDD-related indication, e.g., a DPA indication). The UE may compensate the AGC difference based on indicated DPA. An AGC-symbol (e.g., based on a pre-defined and/or pre-configured rule) may be transmitted before an XDD-symbol/slot.

A UE may be configured to receive configuration information indicating a first set of RBs (e.g., for performing a CSI-RS measurement). The UE may also be configured to receive an indication indicating a second set of RBs. The second set of RBs may be indicated as DL RBs. The second set may include a subset of the first set of RBs and might not include all the RBs in the first set. The UE may receive an indication indicating that a first set of symbols or slots (symbols/slots) is not intended for XDD (e.g., non-XDD symbols/slots) and a second set of symbols/slots is intended for XDD (e.g., XDD symbols/slots).

A UE may measure a first CSI-RS in the first set of RBs in a symbol or slot in the first set of symbols/slots. On a condition that the UE is allowed to combine CSI-RS measurements from XDD and non-XDD symbols/slots, the UE may measure a second CSI-RS in a symbol or slot of the second set of symbols/slots in RBs that are in both the first set of RBs and the second set of RBs. The UE may determine a CSI (e.g., CQI, PMI, RI, L1-RSRP) based on the measurement of the first CSI-RS and the second CSI-RS (e.g., average) and report the CSI to the base station or gNB.

In an example, the UE may receive an indication indicating that the UE is allowed to combine CSI-RS measurements from XDD and non-XDD symbols/slots. On a condition that the UE is not allowed (or does not receive an indication indicating that the UE is allowed) to combine CSI-RS measurements from XDD and non-XDD symbols/slots, the UE may determine the CSI based on the first CSI-RS and may report the CSI to the base station or gNB. It should be noted that, as described herein, XDD may be alternately referred to as SBFD and vice versa.

FIG. 2 is a table illustrating representative slot formats associated with a slot. NR supports dynamic time division duplex (TDD) by a group-common (GC) DCI format 2_0, e.g., as in Table 11.1.1-1 shown in FIG. 2 that indicates a slot format, in addition to semi-static configurations of tdd-UL-DL-config-common/dedicated. Each slot/symbol may be one of a 'DL' slot/symbol, a 'UL' slot/symbol, or a 'Flexible' slot/symbol.

Figure 3A:
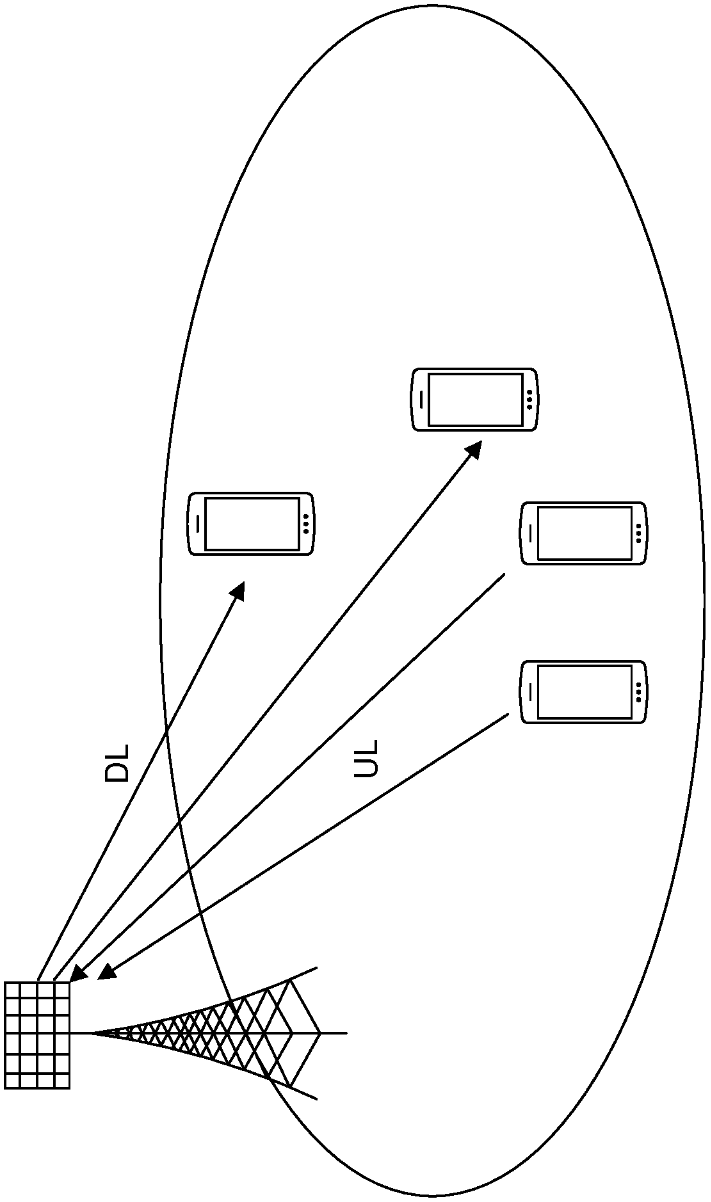
FIG. 3A is a diagram illustrating a representative cell using a full duplex base station and half duplex UEs, according to an embodiment.
Figure 3B:
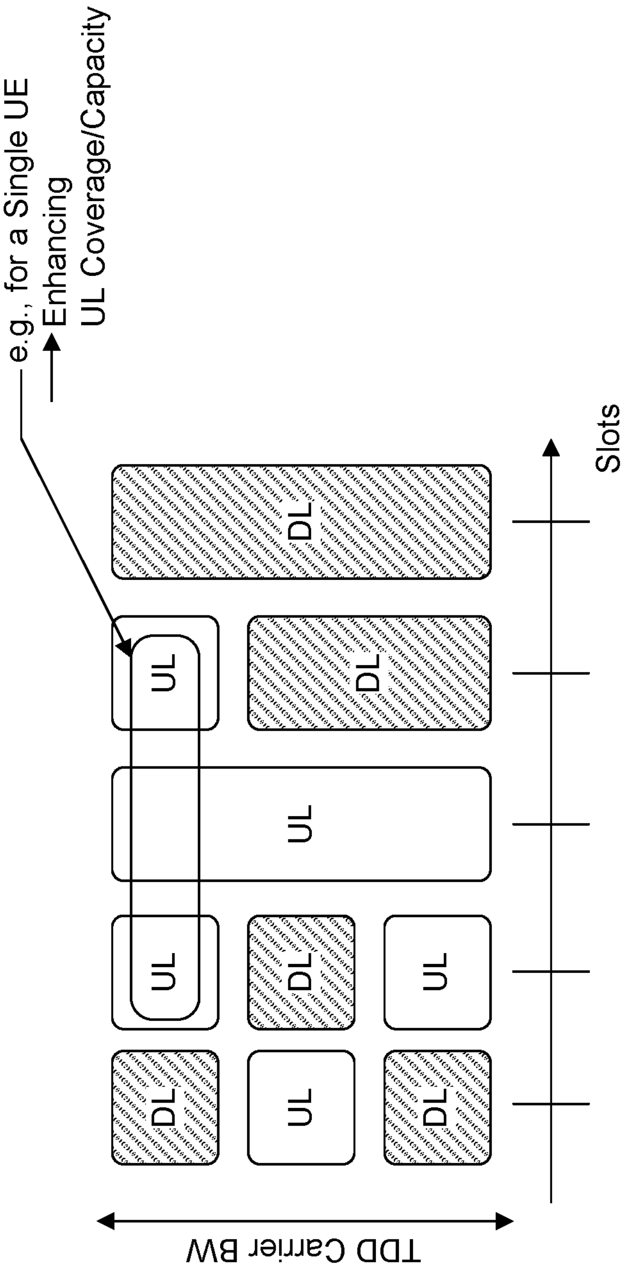
FIG. 3B is a diagram illustrating a representative transmission scheme for the cell of FIG. 3A, according to an embodiment.

FIG. 3A is a diagram illustrating a representative cell using a full duplex base station and half duplex UEs. FIG. 3B is a diagram illustrating a representative transmission scheme for the cell of FIG. 3A.

Referring to FIGS. 3A and 3B, a cell may include a base station/gNB and a number of UEs in a coverage area. In certain representative embodiments, methods, apparatus and systems may be implemented for cross division duplex (XDD) (e.g., sub-band level full duplex (FD)) and/or SBFD. In FIGS. 3A and 3B, a representative transmission scheme is shown, for example offering reduced (e.g., much reduced) FD implementation complexity, in terms of cancelling self-interference (SI) and mitigating cross-link interference (CLI), at least, at the transmitter (e.g., at the base station/gNB).

In certain examples, in which a gNB-side XDD is applied, the gNB may transmit and/or may need to transmit the DL with different transmit power across the time-domain (e.g., across different XDD-slot/symbol and/or non-XDD slot/symbol), for example to cope with (e.g., to reduce) self-interference (SI) at the gNB. For example, on a non-XDD slot/symbol, a determination of a DL Tx power may be the same as for a legacy determination, but on a XDD slot/symbol, a DL Tx power may be reduced by applying a power back-off (PBO), for example due to the SI at the gNB. This applied PBO may have an impact on DL measurement behavior/procedures of the UE and/or may degrade the measurement performance, as the UE may perform measurement averaging across the time domain, for example for noise suppression, etc. It is contemplated that there are no solutions on how to mitigate the degradation on the UE measurement performance and efficiently manage such measurement behaviors/procedures while mitigating gNB-side SI in the XDD operations.

In certain representative embodiments, method, apparatus and systems may be implemented for UE measurement and reporting behaviors/procedures to support cases of a FD gNB and half duplex (HD) UEs.

The term "sub-band" is used to refer to a frequency-domain resource and may be characterized by at least one of the following: (1) a set of resource blocks (RBs); (2) a set of resource block sets (RB sets) (e.g., when a carrier has intra-cell guard bands); (3) a set of interlaced resource blocks; (4) a bandwidth part, or portion thereof; and/or (5) a carrier, or portion thereof. For example, a sub-band may be characterized by a starting RB and number of RBs for a set of contiguous RBs within a bandwidth part. A sub-band may be defined by a value of a frequency-domain resource allocation field and bandwidth part index.

The term "XDD" and/or "SBFD" is used to refer to a sub-band-wise duplex (e.g., either UL or DL being used per sub-band) and may be characterized by at least one of the following:

(1) Cross Division Duplex (e.g., sub-band-wise FDD within a TDD band);
(2) sub-band-based full duplex (e.g., full duplex as both UL and DL are used/mixed on a symbol/slot, but with either UL or DL being used per sub-band on the symbol/slot);
(3) frequency-domain multiplexing (FDM) of DL/UL transmissions within a TDD spectrum;
(4) a sub-band with non-overlapping full duplex (e.g., non-overlapped sub-band full-duplex);

(5) a full duplex other than a same-frequency (e.g., spectrum sharing, sub-band-wise-overlapped) full duplex; and/or (6) an advanced duplex method, e.g., other than (pure) TDD or FDD.

The term "MCS adjustment" may be used to refer to (e.g., UE-initiated/oriented) modulation coding scheme (MCS) change and/or adjustment from a scheduled, configured and/or indicated MCS level for a UL (or DL) resource. As referred to herein, "MCS adjustment" may be used as a representative name for the (e.g., UE-initiated/oriented) MCS change and/or adjustment but not limited to only a specific example.

For example, the term "MCS adjustment" may imply an MCS change between a first MCS (e.g., scheduled/configured/indicated associated with a UL (or DL) resource) and a second (or alternate) MCS. A UE may determine the second MCS from the MCS adjustment (but not necessarily). In an example, the first MCS may be an MCS configured or activated for configured grant (CG) type 1 or 2 (for UL), or an MCS in semi-persistent scheduling (SPS) activation command (for DL), or an MCS indicated in DCI for dynamic grant or dynamic assignment, etc.

The term "dynamic (or flexible) TDD" may be used to refer to a TDD system and/or cell that may dynamically (and/or flexibly) change, adjust and/or switch a communication direction (e.g., a downlink, an uplink, or a sidelink, etc.) on a time instance (e.g., slot, symbol, subframe, and/or the like). In an example, in a system employing dynamic/flexible TDD, a component carrier (CC) or a bandwidth part (BWP) may have one single type among 'D', 'U', and 'F' on a symbol/slot, based on an indication by a group-common (GC)-DCI (e.g., format 2_0) comprising a slot format indicator (SFI), and/or based on tdd-UL-DL-config-common/dedicated configurations. On a given time instance, slot and/or symbol, a first gNB (e.g., cell, TRP) employing dynamic/flexible TDD may transmit a downlink signal to a first UE being communicated and/or associated with the first gNB based on a first SFI and/or tdd-UL-DL-config configured and/or indicated by the first gNB, and a second gNB (e.g., cell, TRP) employing dynamic/flexible TDD may receive an uplink signal transmitted from a second UE being communicated and/or associated with the second gNB based on a second SFI and/or tdd-UL-DL-config configured and/or indicated by the second gNB. In an example, the first UE may determine that the reception of the downlink signal is being interfered by the uplink signal, where the interference caused by the uplink signal may refer to a UE-to-UE cross-layer interference (CLI).

A UE may transmit and/or may receive a physical channel and/or reference signal according to at least one spatial domain filter. The term "beam" may be used to refer to a spatial domain filter.

The UE may transmit a physical channel and/or signal using the same spatial domain filter as the spatial domain filter used for receiving an RS (such as a CSI-RS) or a Synchronization Signal (SS) block (SSB). The UE transmission may be referred to as "target", and the received RS or SSB may be referred to as "reference" or "source". In such a case, the UE may be stated to transmit the target physical channel or signal according to a spatial relation with a reference to such an RS or an SSB.

The UE may transmit a first physical channel and/or signal according to the same spatial domain filter as the spatial domain filter used for transmitting a second physical channel and/or signal. The first and second transmissions may be referred to as "target" and "reference" (or "source"), respectively. In such a case, the UE may be stated to transmit the first (target) physical channel and/or signal according to a spatial relation with a reference to the second (reference) physical channel and/or signal.

A spatial relation may be implicit, configured by Radio Resource Control (RRC), signaled by a MAC Control Element (CE) and/or DCI. For example, a UE may transmit (e.g., implicitly transmit) a Physical Uplink Shared Channel (PUSCH) (e.g., a PUSCH transmission) and/or control signalling (e.g., one or more Demodulation Reference Signals (DM-RSs) associated with the PUSCH for example in a transmission) according to the same spatial domain filter as one or more Sounding Reference Signals (SRSs) indicated by an SRS resource indicator (SRI) indicated in the DCI and/or configured by the RRC. In some examples, a spatial relation may be configured by the RRC for an SRI and/or signaled by a MAC CE for a Physical Uplink Control Channel (PUCCH). Such a spatial relation may be referred to as a "beam indication".

The UE may receive a first (target) DL channel and/or signal according to the same spatial domain filter and/or one or more spatial reception parameters as a second (reference) DL channel and/or signal. For example, such an association may exist between a physical channel such as the PDCCH and/or the PDSCH and the DM-RS for the respective channel or channels. At least when the first and second signals are reference signals, such an association may exist when the UE is configured with a quasi-colocation (QCL) assumption type D between corresponding antenna ports. The association may be configured as a transmission configuration indicator (TCI) state. A UE may indicate an association between a CSI-RS or a SSB and a DM-RS by an index to a set of TCI states configured by the RRC and/or signaled by a MAC CE. Such an indication may be referred to as a "beam indication".

A TRP (e.g., transmission and reception point) may interchangeably be referred to as one or more of transmission point (TP), reception point (RH), remote radio head (RRH), distributed antenna (DA), base station (BS), a sector (of a BS), and/or a cell (e.g., a geographical cell area served by a BS), while remaining consistent with example embodiments described herein. In addition, multi-TRP may be interchangeably referred to as one or more of MTRP, M-TRP, and multiple TRPs, while still remaining consistent with example embodiments.

A UE may report a subset of channel state information (CSI) components, where CSI components may correspond to at least a CSI-RS resource indicator (CRI), a SSB resource indicator (SSBRI), an indication of a panel used for reception at the UE (e.g., a panel identity or group identity), measurements such as L1-RSRP, L1-SINR taken from SSB or CSI-RS (e.g., cri-RSRP, cri-SINR, ssb-Index-RSRP, ssb-Index-SINR), and/or other channel state information such as at least rank indicator (RI), channel quality indicator (CQI), precoding matrix indicator (PMI), Layer Index (LI), and/or the like.

A UE may receive a synchronization signal/physical broadcast channel (SS/PBCH) block. The SS/PBCH block (SSB) may include a primary synchronization signal (PSS), secondary synchronization signal (SSS), and/or physical broadcast channel (PBCH). The UE may monitor, receive, and/or attempt to decode an SSB during initial access, initial synchronization, radio link monitoring (RLM), cell search, cell switching, and so forth.

A UE may measure and report the CSI, where the CSI for each connection mode may include or be configured with one or more of: CSI report configuration, CSI-RS resource set, and/or NZP CSI-RS resources.

The CSI report configuration may include one or more of the following: (1) CSI report quantity, e.g., Channel Quality Indicator (CQI), Rank Indicator (RI), Precoding Matrix Indicator (PMI), CSI-RS Resource Indicator (CRI), Layer Indicator (LI), etc.; (2) CSI report type, e.g., aperiodic, semi persistent, periodic; (3) CSI report codebook configuration, e.g., Type I, Type II, Type II port selection, etc.; and/or (4) CSI report frequency.

The CSI-RS resource set may include one or more of the following CSI Resource settings: (1) NZP-CSI-RS resource for channel measurement; (2) NZP-CSI-RS resource for interference measurement; and/or (3) CSI-IM resource for interference measurement.

The NZP CSI-RS resources may include one or more of the following: (1) NZP CSI-RS resource ID; (2) periodicity and offset; (3) QCL information and TCI-state; and/or (4) resource mapping, e.g., number of ports, density, CDM type, etc.

A UE may indicate, determine, and/or be configured with one or more reference signals. The UE may monitor, receive, and/or measure one or more parameters based on the respective reference signals. For example, one or more parameters may be included in reference signal(s) measurements. The following parameters are non-limiting examples of the parameters that may be included in reference signal(s) measurements: SS reference signal received power (SS-RSRP), CSI-RSRP, SS signal-to-noise and interference ratio (SINR), CSI-SINR, received signal strength indicator (RSSI), cross-layer interference received signal strength indicator (CLI-RSSI), and/or sounding reference signals RSRP (SRS-RSRP). However, it should be noted that other parameters may additionally or alternatively be included.

SS-RSRP may be measured based on the synchronization signals (e.g., demodulation reference signal (DMRS) in PBCH or SSS). It may be defined as the linear average over the power contribution of the resource elements (RE) that carry the respective synchronization signal. In measuring the RSRP, power scaling for the reference signals may be needed. In case SS-RSRP is used for L1-RSRP, the measurement may be accomplished based on CSI reference signals in addition to the synchronization signals.

CSI-RSRP may be measured based on the linear average over the power contribution of the resource elements (RE) that carry the respective CSI-RS. The CSI-RSRP measurement may be configured within measurement resources for the configured CSI-RS occasions.

SS-SINR may be measured based on the synchronization signals (e.g., DMRS in PBCH or SSS). It may be defined as the linear average over the power contribution of the resource elements (RE) that carry the respective synchronization signal divided by the linear average of the noise and interference power contribution. In case SS-SINR is used for L1-SINR, the noise and interference power measurement may be accomplished based on resources configured by higher layers.

CSI-SINR may be measured based on the linear average over the power contribution of the resource elements (RE) that carry the respective CSI-RS divided by the linear average of the noise and interference power contribution. In case CSI-SINR is used for L1-SINR, the noise and interference power measurement may be accomplished based on resources configured by higher layers. Otherwise, the noise and interference power may be measured based on the resources that carry the respective CSI-RS.

RSSI may be measured based on the average of the total power contribution in configured OFDM symbols and bandwidth. The power contribution may be received from different resources (e.g., co-channel serving and non-serving cells, adjacent channel interference, thermal noise, and so forth).

CLI-RSSI may be measured based on the average of the total power contribution in configured OFDM symbols of the configured time and frequency resources. The power contribution may be received from different resources (e.g., cross-layer interference, co-channel serving and non-serving cells, adjacent channel interference, thermal noise, and so forth).

SRS-RSRP may be measured based on the linear average over the power contribution of the resource elements (RE) that carry the respective SRS.

A property of a grant or assignment may include at least one of the following: a frequency allocation; an aspect of time allocation, such as a duration; a priority; a modulation and coding scheme; a transport block size; a number of spatial layers; a number of transport blocks; a TCI state, CRI or SRI; a number of repetitions; whether the repetition scheme is Type A or Type B; whether the grant is a configured grant type 1, type 2 or a dynamic grant; whether the assignment is a dynamic assignment or a semi-persistent scheduling (configured) assignment; a configured grant index or a semi-persistent assignment index; a periodicity of a configured grant or assignment; a channel access priority class (CAPC); and/or any parameter provided in a DCI, by MAC or by RRC for the scheduling the grant or assignment.

An indication by DCI may include at least one of the following: an explicit indication by a DCI field or by RNTI used to mask CRC of the PDCCH and/or an implicit indication by a property, such as DCI format, DCI size, CORESET or search space, aggregation level, first resource element of the received DCI (e.g., index of first Control Channel Element), where the mapping between the property and the value may be signaled by RRC or MAC.

The term "RS" may be interchangeably used with one or more of: (1) one or more RS resources, (2) one or more RS resource sets, (3) one or more RS ports and/or (4) one or more RS port groups. Also, RS may be interchangeably used with one or more of: (1) SSB, (2) CSI-RS, (3) SRS and/or (4) DM-RS, for example as different types of RSs.

Representative Procedures Using DL Power Adjustment (DPA) Indications

In certain representative embodiments, a UE may receive, obtain and/or be informed of (e.g., via a network entity/gNB/base station) information indicating/including one or more parameters and/or values (e.g., information content) representing an amount of the DPA (e.g., DL Tx power back-off (PBO), DL Tx power boosting, DL Tx power change, DL Tx power variation, etc.), applied or to be applied on one or more DL symbols/signals/channels, for example transmitted by the base station/gNB.

The UE may receive an indication of the information contents to be applied on the one or more XDD symbols/slots after a first time offset from (e.g., after) reception of the indication. The first time offset may be configured, predefined, and/or indicated to the UE. In certain examples, the information content or contents may be associated with (e.g., configured with, and/or indicated with) a slot/symbol-type indication for the XDD. One or more slots/symbols indicated for XDD (e.g., sub-band-wise, and/or with one or more mixed UL RBs and DL RBs may co-exist). In various examples, the information content or contents may be associated with (e.g., configured with, and/or indicated with) a tdd-UL-DL-config parameter, e.g., for which the slot/symbol-type indication for XDD may be included, indicated, and/or associated.

The UE may receive an indication of the information (e.g., contents) to be applied on the one or more XDD symbols/slots, for example by an explicit signaling (e.g., via the RRC, a MAC-CE, and/or DCI). After or once the UE receives the indication of the information (e.g., contents) by the explicit signaling, the UE may apply the indication of the information (e.g., contents) until receiving a next indication, for example by a second explicit signaling, of the information (e.g., contents). The UE may receive a parameter, receive an indication indicating the parameter, be configured with the parameter and/or may determine the parameter for DPA application time. The parameter for the DPA application time may be used to determine (e.g., exactly determine) when to apply the received explicit signaling. The UE may report information indicating a UE capability parameter of a supported DPA application time. The parameter for the DPA application time may depend on the reported information indicating the UE capability parameter. The UE may transmit and/or may be configured to transmit an acknowledgement (ACK) after successfully receiving the explicit signaling that may include the indication of the information (e.g., contents). The parameter for the DPA application time may be applied based on (e.g., depending on, associated with, or after) the ACK transmission timing. The parameter for the DPA application time may be applied and/or may be configured to be applied simultaneously and/or concurrently for (e.g., across) multiple CCs/BWPs.

In various examples, the UE may determine (e.g., identify, calculate, and/or assume) that a transmitted first DL power level of a base station and/or gNB of the one or more XDD symbols/slots may be adjusted (e.g., changed, shifted, and/or varied), based on the indicated information, from (e.g., compared with) a second DL power level of one or more non-XDD symbols/slots. After or in response to the determination, the UE may identify (e.g., determine, calculate, and/or assume) a power ratio of the first DL power level (e.g., of the one or more XDD symbols/slots) to the second DL power level (of the one or more non-XDD symbols/slots). Based on (e.g., using) the power ratio and/or based on the information, the UE may perform (e.g., apply, and/or conduct) one or more DL reception behaviors/procedures on the one or more XDD symbols/slots including any of: (1) power-level compensation (e.g., to derive a CSI), (2) automatic measurement restriction (MR), e.g., MR=ON, for a symbol/slot (e.g., for a XDD symbol/slot), (3) a measurement skipping operation/behavior, e.g., for one or more XDD symbols/slots, and/or (4) a UE-triggered automatic gain control (AGC) adjustment, e.g., for one or more XDD symbols/slots.

The information (e.g., information contents) may include at least one of the following:

(1) an absolute amount of the DPA (e.g., in dB), which the UE may apply and/or may be configured to apply to a DL power level of one or more non-XDD symbols/slots, e.g., as the second DL power level, for determining/deriving/calculating/identifying an adjusted/changed/shifted DL power level of the one or more XDD symbols/slots, for example, as a first DL power level. In certain examples, the first DL power level may be identified (e.g., determined, calculated, and/or assumed) as the second DL power level minus the absolute amount of the DPA. In certain examples, if a DL Tx power level on the one or more non-XDD slots/symbols is determined/set to a value P, the UE may apply the indicated absolute amount of the DPA to P, to determine (e.g., identify, and/or calculate) a DL Tx power level of the one or more XDD symbols/slots.

(2) an absolute amount of an extra DPA (e.g., in dB) applied or to be applied on a scaled (e.g., determined, and/or calculated) DL Tx power level. The scaled DL Tx power level may be determined based on a ratio of a number of DL RBs to a number of second RBs of one or more XDD-slots/symbols. In certain examples, the one or more second RBs may include at least one of: (1) one or more whole RBs of a system bandwidth (e.g., the current system bandwidth and/or the operating bandwidth), one or more BWPs, one or more component carriers (CCs), one or more RBs in one or more BWPs, one or more RBs in one or more CCs, one or more RBs in one or more sub-bands, one or more RBs corresponding to resources having the determined second DL power level (e.g., the one or more non-XDD symbols/slots), and/or (2) a number of indicated/configured one or more non-DL RBs (e.g., where the one or more non-DL RBs may include at least a number of indicated/configured UL RBs and/or a number of indicated/configured "Flexible" RBs). In some examples, the number of DL RBs may include a number of DL BWPs, and the one or more second RBs may at least include a number of UL BWPs. For example, the UE may apply and/or be configured to apply the absolute amount of the extra DPA (e.g., in dB) to a scaled DL power level from one or more non-XDD symbols/slots, e.g., a scaled DL power level from the second DL power level, for determining/deriving/calculating/identifying an adjusted/changed/shifted DL power level of the one or more XDD symbols/slots, e.g., as the first DL power level. For example, the scaled DL power level may be determined based on the ratio of the number of DL RBs to the number of second RBs. In some examples, the first DL power level may be identified (e.g., determined, calculated, and/or assumed) as the scaled DL power level (from the second DL power level) minus the absolute amount of the extra DPA. In certain examples, if or on condition that a DL Tx power level of a non-XDD slot/symbol is a value P (e.g., is assumed/determined to be a value P) and the ratio of the number of DL RBs to the number of second RBs (e.g., of one or more XDD symbols/slots) is the value 1/2, the UE may apply the indicated absolute amount of the extra DPA to P/2, for determining (e.g., identifying, and/or calculating) a DL Tx power level (e.g., of the one or more XDD symbols/slots).

(3) a first ratio value and/or parameter representing the DPA, which the UE may apply and/or be configured to apply to a DL power level of one or more non-XDD symbols/slots, e.g., as the second DL power level, for determining/deriving/calculating/identifying an adjusted/changed DL power level of the one or more XDD symbols/slots based on the first ratio value/parameter, e.g., as the first DL power level. In certain examples, the first DL power level may be identified (e.g., determined, calculated, and/or assumed) as the second DL power level multiplied by the first ratio value/parameter. In some examples, if and/or on condition that a DL Tx power level of one or more non-XDD slots/symbols is a value P (e.g., is assumed/determined to be a value P), the UE may apply the indicated first ratio value/parameter (e.g., by multiplying the indicated first ratio value/parameter by P) to determine (e.g., identify and/or calculate) a DL Tx power level of the one or more XDD symbols/slots.

(4) a second ratio value and/or parameter representing an extra DPA applied and/or to be applied based on a scaled (e.g., determined and/or calculated) DL Tx power level. For example the scaled DL Tx power level may be determined based on a ratio of a number of DL RBs to a number of second RBs of one or more XDD-slots/symbols. In some examples, the one or more second RBs may include at least one of: one or more whole RBs of a system bandwidth (e.g., the current system bandwidth and/or the operating bandwidth), for example one or more BWPs, one or more CCs, one or more RBs in one or more BWPs, one or more RBs in one or more CCs, one or more RBs in one or more sub-bands, one or more RBs corresponding to resources having the determined second DL power level (e.g., the one or more non-XDD symbols/slots), and/or a number of indicated/configured non-DL RBs, for example where the one or more non-DL RBs may include at least a number of indicated/configured UL RBs and/or a number of indicated/configured "Flexible" RBs. In some examples, the number of DL RBs may include a number of DL BWPs, and the one or more second RBs may at least include a number of UL BWPs. In some examples, the UE may apply and/or may be configured to apply the second ratio value/parameter to a scaled DL power level from one or more non-XDD symbols/slots, e.g., a scaled DL power level from the second DL power level, for determining/deriving/calculating/identifying an adjusted/changed DL power level of the one or more XDD symbols/slots, e.g., as the first DL power level. In certain examples, the scaled DL power level may be determined based on the ratio of the number of DL RBs to the number of second RBs. In some examples, the first DL power level may be identified (e.g., determined, calculated, and/or assumed) as the scaled DL power level (e.g., from the second DL power level) multiplied by the second ratio value/parameter. For example, if a DL Tx power level of one or more non-XDD slots/symbols is a value P (e.g., is assumed/determined to be the value P) and the ratio of the number of DL RBs to the number of second RBs (e.g., of the one or more XDD symbols/slots) is a value 1/2, the UE may apply the indicated second ratio value/parameter to (e.g., multiply the indicated second ratio value/parameter by) P/2 to determine (e.g., identify, and/or calculate) a DL Tx power level (e.g., of the one or more XDD symbols/slots).

(5) a DPA value and/or parameter applicable per resource element (RE) (e.g., per DL-RE), e.g., combined with (e.g., signaled along with, and/or signaled together with) second information indicating how many REs are allocated (e.g., assigned, and/or indicated) for the DL on one or more XDD symbols/slots. In certain examples, if or on condition that the DPA value/parameter applicable per RE and the second information are given (e.g., determined, identified, configured, and/or indicated) to the UE as a value Q (e.g., in dB, or a ratio parameter, etc.) and 72 REs (e.g., as 6 RBs), on one or more XDD symbols/slots, the UE may determine an adjusted/changed/shifted DL power level of the one or more XDD symbols/slots, e.g., as the first DL power level, based on the value Q multiplied by 72 (e.g., by scaling a DL power level of the one or more symbols/slots using the value Q and the number of REs effected). The DL power level of the one or more symbols/slots may be a DL power level on the one or more non-XDD symbols/slots, e.g., as the second DL power level.

In certain representative embodiments, the information (e.g., the information contents) of a parameter and/or value representing an amount of DPA being applied on one or more DL symbols/signals/channels may be included based on whether one or more adjacent UL RBs are scheduled (e.g., are actually scheduled).

In certain examples, when an RB-level distance and/or a frequency-domain distance between DL RBs applied (e.g., associated, and/or affected) based on and/or applied by the information contents and the UL RBs is below a threshold X1 (e.g., X1=5 RBs), at least one of the above examples included in the information contents may apply.

When an RB-level distance between DL RBs (e.g., applied, associated, and/or affected based on the information contents) and the UL RBs is below a threshold X2 (e.g., X2=3 RBs), at least one of the above examples included in the information contents may apply based on applying a second parameter for extra power adjustment. The second parameter for extra power adjustment may be pre-defined, pre-configured, an/or indicated. The second parameter for extra power adjustment may reduce (e.g., further reduce) a DL power level determined by the information contents, e.g., as the RB-level distance decreases. For example, the extra power adjustment may provide a benefit to efficiently cope with mitigating a self-interference by reducing the DL power level when the DL RBs are adjacent with the UL RBs (e.g., based on an adjacent distance being below the threshold X2).

When an RB-level distance between DL RBs (e.g., applied, associated, and/or affected based on the information contents) and the UL RBs is above a threshold X1 (e.g., X1=5 RBs), at least one of the above examples included in the information contents may not apply and/or may be applied as a power boosting. For example, the power boosting may provide benefits to improve a DL reception performance at a UE as a gNB may utilize (e.g., borrow unused power/energy from) one or more unused RBs for the DL of one or more XDD symbols/slots to boost the DL power level of one or more allocated/scheduled DL RBs of the one or more XDD symbols/slots.

In certain examples, the information contents indicating a parameter and/or value representing an amount of DPA applied and/or to be applied on one or more DL symbols/signals/channels may be indicated sub-band-wise (e.g., per sub-band or for one or more selective sub-bands). In certain examples, a DPA indication based on the information contents may be varying per sub-band. In some examples, a DPA indication (e.g., based on the information contents) may be applied (e.g., only applied) on a subset of DL regions/RBs (e.g., only edge regions of the one or more DL RBs, for example within one or more BWPs/CCs). The edge regions (e.g., only edge regions) of the one or more DL RBs applied (e.g., associated, and/or affected) using the information contents may be defined, configured, identified, determined, and/or indicated as the first X RBs (e.g., the lowest X RBs within the one or more DL RBs) and/or second Y RBs (e.g., the highest Y RBs within the one or more DL RBs). X and/or Y may be pre-defined, pre-configured, and/or indicated. In some examples, a DPA indication based on the information contents may include/indicate one or more multi-level DPA values based on and/or depending on an adjacent frequency gap (FG) (e.g., the RB-level distance, the RE-level distance, or frequency-domain distance between the one or more DL RBs applied (e.g., associated, and/or affected) based on or applied using the information contents and the one or more UL RBs of the one or more XDD symbols/slots).

For example, a UE may be configured with and/or may be sent an indication (e.g., from a base station/gNB) indicating one or more modes for full duplex (FD) operations including:

(1) a first FD mode (e.g., Mode 1) in which there is frequency-domain full-overlapping FD for the base station/gNB (e.g., one or more first RBs for DL transmissions from the base station/gNB and one or more second RBs for UL receptions at the base station/gNB may be overlapped or at least partially overlapped) and, for example the DPA indication to the UE, based on the information contents, may be included or indicated symbol/slot-wise (e.g., per symbol/slot); and/or (2) a second FD mode (e.g., Mode 2) in which there is sub-band-wise non-overlapping FD (e.g., using XDD) and, for example, the DPA indication, based on the information contents may be included and/or indicated sub-band-wise (e.g., per sub-band).

In certain examples, for example for Mode 2, the DPA indication may be applied (e.g., only applied) on a subset of DL regions/RBs (e.g., only edge regions of the one or more DL RBs applied based on and/or applied using the information contents), e.g., within one or more BWPs/CCs.

Figure 4A:
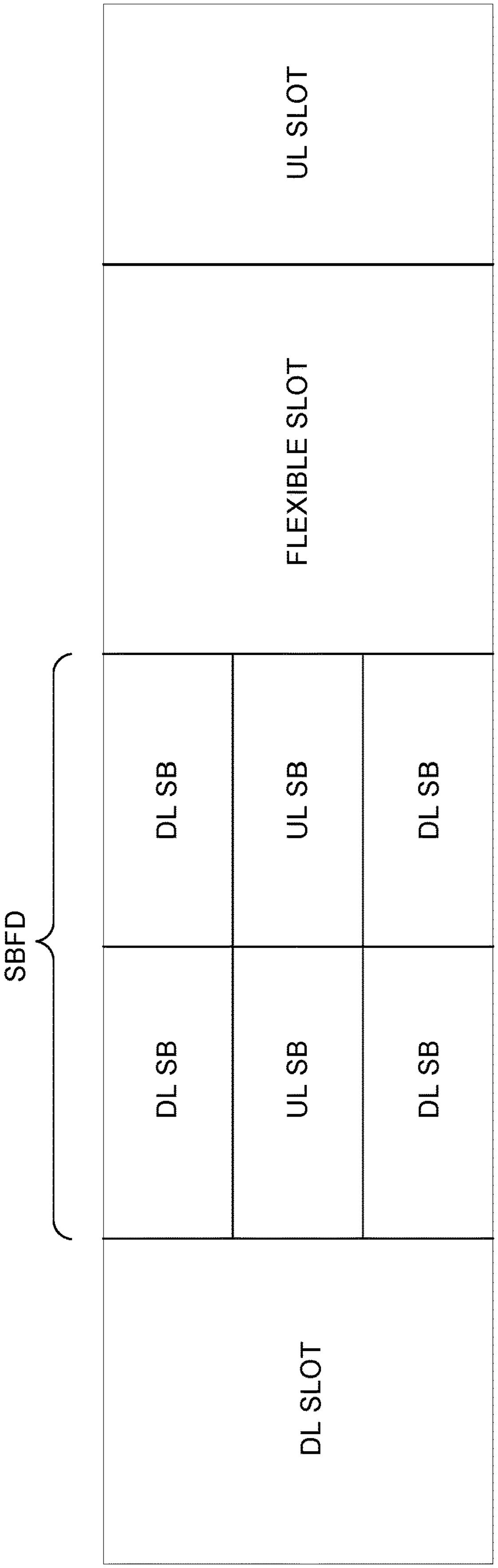
FIG. 4A is a diagram illustrating a representative subband non-overlapping full duplex, according to an embodiment.

Representative CSI-RS Measurements and CSI Reporting in Subband Non-Overlapping Full Duplex (SBFD) Procedures In an example, NR duplex operation (e.g., NR-Duplex, XDD, etc.) could be a good foundation for improving conventional TDD operation by enhancing UL coverage, improving capacity, reducing latency, and so forth. The conventional TDD operation is based on splitting the time domain between the uplink and downlink. Feasibility of allowing full duplex, or more specifically, subband non-overlapping full duplex (SBFD) (e.g., at the gNB) within a conventional TDD band may be considered. For instance, FIG. 4A illustrates an example of a 'SBFD slot', comprising a frequency resource allocation based on a combination of 'DL SB(s)' and 'UL SB(s)'. This may represent an example of a slot/symbol-type indication for XDD and/or SBFD (XDD/SBFD), e.g., by an enhanced tdd-UL-DL-config comprising a mixed UL/DL slot/symbol-type, etc. In an example, a "mixed (UL/DL) slot/symbol-type" may indicate a slot/symbol that can be used for both DL and UL, each being allocated with (non-overlapping) independent RB(s) on the slot/symbol, e.g., for XDD/SBFD (e.g., at a gNB side). A gNB may schedule UL and DL resources to UEs within the UL and DL non-overlapping subbands, respectively. It is noted that, as described herein, XDD and SBFD may be used interchangeably.

Operations based on the 'SBFD slot' may reduce implementation complexity in FD at least at the gNB. Unless scheduling flexibility is significantly limited, FD at the gNB may result in interference to CSI-RS transmissions and, as a result, may impact CSI measurement accuracy. One or more procedures discussed herein may at least provide benefits to mitigate the potential impact of gNB FD to CSI-RS measurement accuracy without sacrificing gNB scheduling flexibility.

Figure 4B:
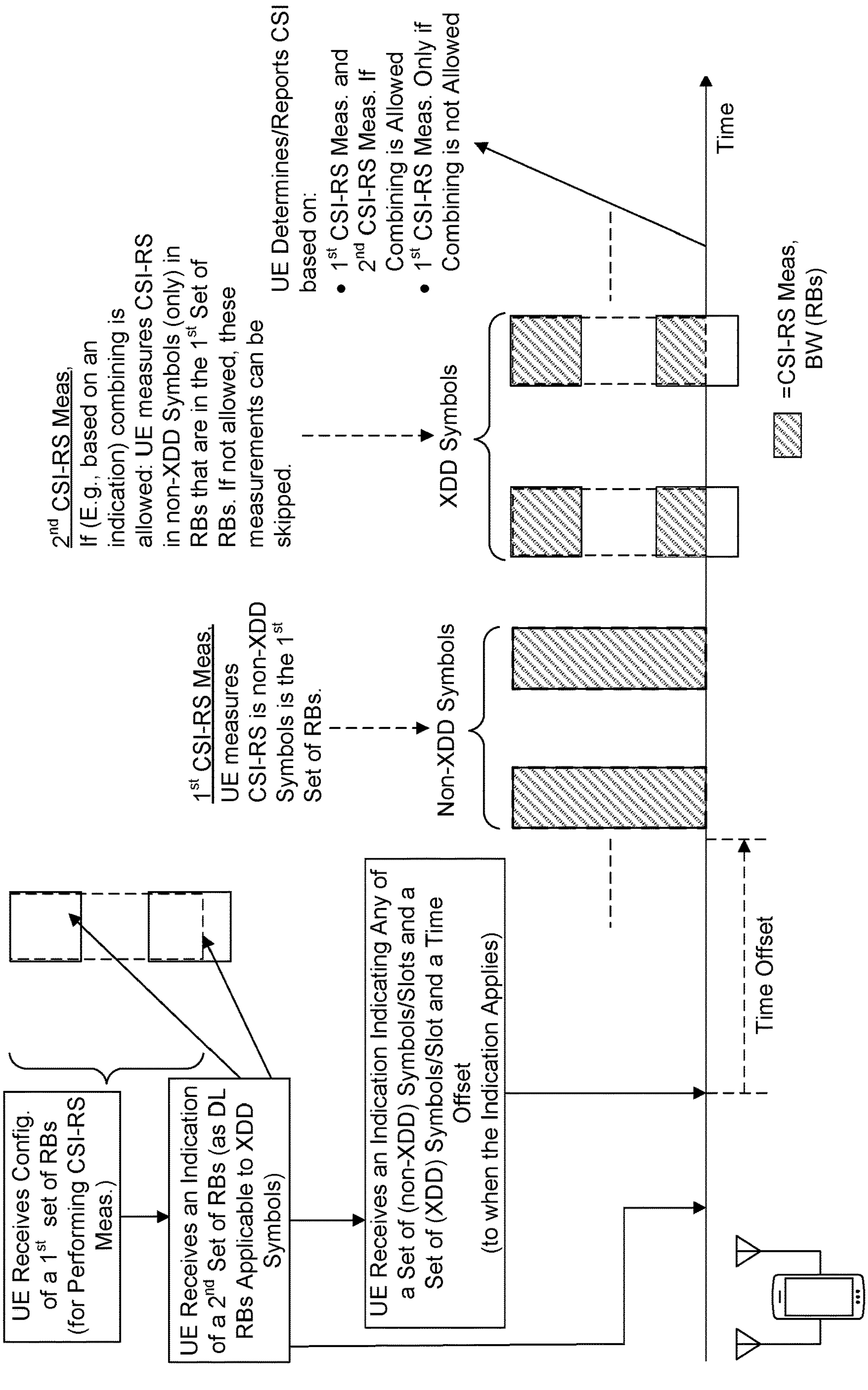
FIG. 4B is a diagram illustrating representative CSI-RS measurements and CSI reporting in SBFD operation, according to an embodiment.

As illustrated in the example of FIG. 4B, in an embodiment, a UE may receive configuration of a first set of RBs (for performing CSI-RS measurement). The UE may receive an indication of a second set of RBs (e.g., as DL RBs applicable to XDD/SBFD symbols), where the second set of RBs may include a subset of the first set of RBs and might not include all the RBs in the first set of RBs. For example, the second set of RBs may at least indicate available DL RB(s) and/or subband(s) (or being not UL subband) of SBFD configuration, which may be indicated and/or configured in a BWP (pair) and/or in a CC/cell level (e.g., along with the CC/cell configuration) or in a system information block (SIB) and/or in a master information block (MIB). As illustrated in the example of FIG. 4B, the second set of RBs may comprise non-contiguous RBs, where the non-contiguous RBs may be based on an UL subband and/or RBs (of the SBFD configuration) being allocated and/or indicated within (e.g., in the middle of) the second set of RBs. In an example, the first set of RBs may be comprised or included within the second set of RBs (e.g., being non-contiguous), where the first set of RBs may be (also) non-contiguous. In an embodiment, the UE may be directly configured with the first set of RBs (e.g., for performing CSI-RS measurement) which may be non-contiguous RBs. In response to receiving (e.g., being configured with) the non-contiguous RBs for performing CSI-RS measurement, the UE may measure the CSI-RS over the non-contiguous RBs (e.g., based on the first set of RBs and/or the second set of RBs), derive a CSI, and report or transmit the CSI, e.g., based on at least one embodiment presented throughout the disclosure. This CSI-RS measurement and CSI reporting behavior based on the non-contiguous RBs may be configured and/or indicated to the UE, based on an independent behavior, or a condition that the CSI-RS measurement is performed on a set of XDD (or SBFD) symbols/slots, and/or a condition that the UE is allowed to combine CSI-RS measurements from XDD (or SBFD) and non-XDD (or non-SBFD) symbols/slot. The UE may receive an indication indicating a set of non-XDD (or non-SBFD) symbols/slots and a set of XDD (or SBFD) symbols/slots, and/or indicating a time offset or time domain pattern for when the indication of the non-XDD (or non-SBFD) and XDD (or SBFD) symbols/slots may apply.

The UE may measure CSI-RS, for example as a first CSI-RS measurement, in non-XDD (or non-SBFD) symbols (e.g., based on the set of non-XDD symbols/slots) in the first set of RBs. If a measurement combining is allowed (e.g., based on a separate indication), the UE may measure CSI-RS, for example as a second CSI-RS measurement, in XDD (or SBFD) symbols in the RBs that are in the first set of RBs and the second set of RBs. The UE may determine and/or report CSI based on the first CSI-RS measurement and the second CSI-RS measurement, e.g., based on combining, averaging, weighted-averaging, combining based on a pre-defined/pre-configured function, etc., if the measurement combining is allowed. If the measurement combining is not allowed, the UE may skip measuring CSI-RS in XDD (or SBFD) symbols, and/or the UE may determine and/or report CSI based on the first CSI-RS measurement.

As described in examples based on FIG. 4B, a UE may receive or be configured to receive configuration information indicating a first set of RBs (e.g., for performing a CSI-RS measurement). The UE may receive an indication indicating a second set of RBs wherein the second set of RBs are indicated as DL RBs. In an embodiment, the second set of RBs may include a subset of the first set of RBs, e.g., it might not include all the RBs in the first set. The UE may receive an indication indicating that a first set of symbols or slots (symbols/slots) is not intended for XDD (i.e., non-XDD symbols/slots) and a second set of symbols/slots is intended for XDD (i.e., XDD symbols/slots).

The UE may measure a first CSI-RS in the first set of RBs in a symbol or slot in the first set of symbols/slots. On a condition that the UE is allowed to combine CSI-RS measurements from XDD (or SBFD) and non-XDD (or non- SBFD) symbols/slot, the UE may measure a second CSI-RS in a symbol or slot of the second set of symbols/slots in RBs that are overlapping or included in both the first set of RBs and the second set of RBs. The UE may determine a CSI (e.g., CQI, PMI, RI, L1-RSRP) based on the measurement of the first CSI-RS and the second CSI-RS (e.g., average the first and second CSI-RS) and report the CSI.

In an example, the UE may receive an indication indicating that the UE is allowed to combine CSI-RS measurements from XDD (or SBFD) and non-XDD (or non-SBFD) symbols/slots. On a condition that the UE is not allowed (or does not receive an indication indicating that the UE is allowed) to combine CSI-RS measurements from XDD (or SBFD) and non-XDD (or non-SBFD) symbols/slots, the UE may determine the CSI based on the first CSI-RS and may report the CSI.

Figure 5:
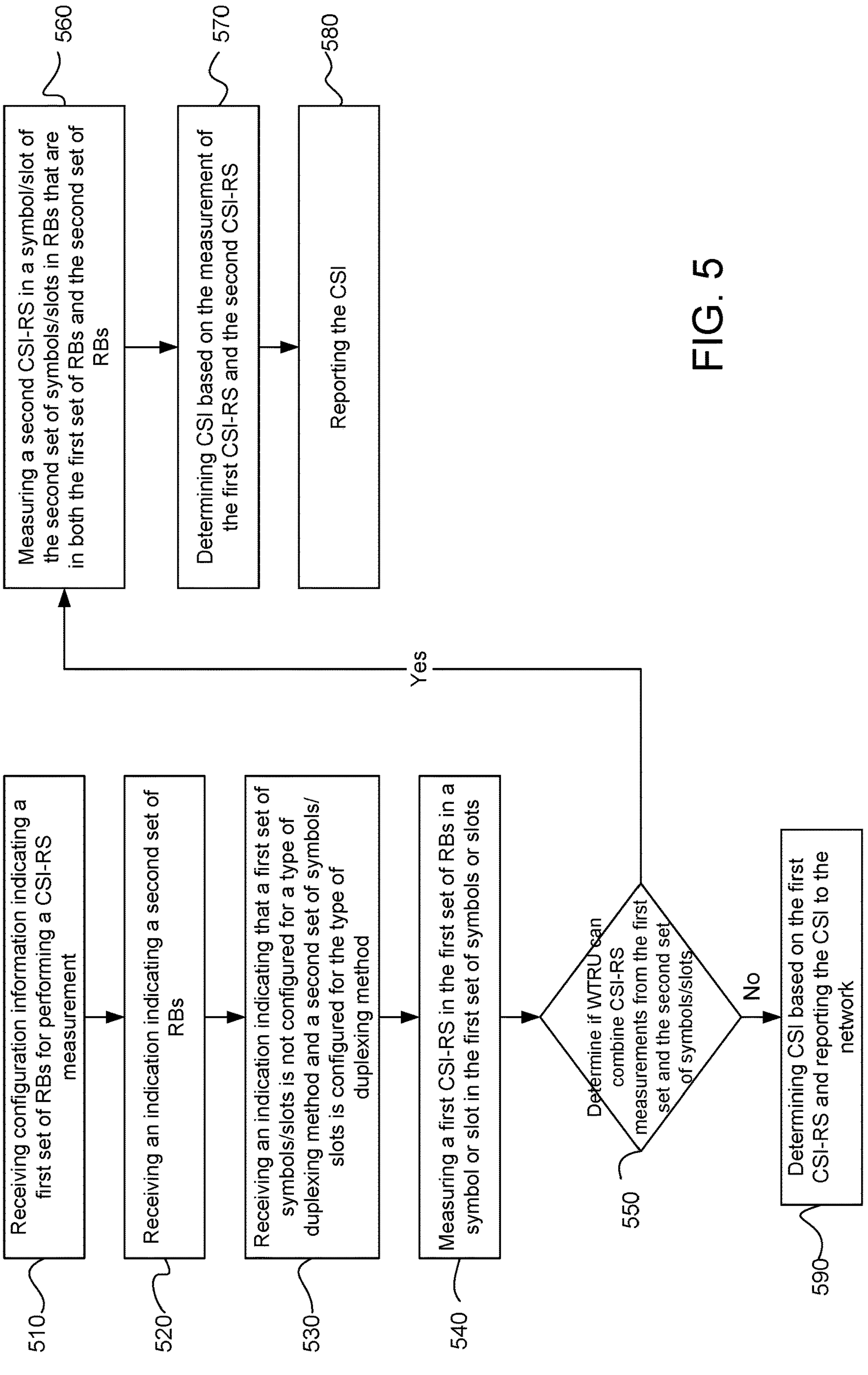
FIG. 5 is a flowchart illustrating an example method for CSI-RS measurements and CSI reporting in SBFD operation, according to an embodiment.

FIG. 5 is a flowchart illustrating an example method for CSI measurements and/or CSI reporting in SBFD, according to an embodiment. In some embodiments, the method of FIG. 5 may be implemented by a WTRU, for example. As illustrated in the example of FIG. 5, the method may include, at 510, receiving configuration information indicating a first set of resource blocks (RBs) for performing a channel state information reference signal (CSI-RS) measurement. According to an embodiment, the method may include, at 520, receiving an indication indicating a second set of RBs. The second set of RBs may be indicated as downlink (DL) RBs, and the second set of RBs may include a subset of the first set of RBs. According to certain embodiments, one or more of the RBs in the second set of RBs may be non-contiguous.

In an embodiment, the method may include, at 530, receiving an indication indicating that a first set of symbols or slots is not configured for a type of duplexing method and a second set of symbols or slots is configured for the type of duplexing method. According to an embodiment, the type of duplexing method may be SBFD and/or XDD, for instance. It should be noted that any of the messages or indications received or transmitted, as discussed herein, may be combined into a single message or indication, according to certain embodiments.

As further illustrated in the example of FIG. 5, the method may include, at 540, measuring a first CSI-RS in the first set of RBs in a symbol or slot in the first set of symbols or slots. In an embodiment, as illustrated at 550, the method may include determining whether the WTRU can or is allowed to combine CSI-RS measurements from the first set of symbols or slots that are not configured for the type of duplexing method and CSI-RS measurements from the second set of symbols or slots that are configured for the type of duplexing method. For example, in one embodiment, the method may include receiving, from a network node, an indication indicating that the WTRU can (or is allowed to) combine CSI-RS measurements from symbols or slots not configured for the type of duplexing method and CSI-RS measurements from symbols or slots configured for the type of duplexing method.

According to certain embodiments, on a condition that the WTRU is to combine CSI-RS measurements from the first set of symbols or slots that are not configured for the type of duplexing method and CSI-RS measurements from the second set of symbols or slots that are configured for the type of duplexing method, the method may include, at 560, measuring a second CSI-RS in a symbol or slot of the second set of symbols or slots in RBs that are overlapping or included in both the first set of RBs and the second set of RBs. At 570, the method may include determining a channel state information (CSI) based on the measurement of the first CSI-RS and the second CSI-RS and, at 580, reporting the CSI to a network or network node (e.g., base station or gNB). In an embodiment, the determining 570 of the CSI based on the first CSI-RS measurement and the second CSI-RS measurement may include averaging the measurement of the first CSI-RS and the second CSI-RS.

On a condition that the WTRU is not to combine CSI-RS measurements from symbols or slots configured for and not configured for the type of duplexing method, or on a condition that the WTRU does not receive an indication indicating that the WTRU can combine CSI-RS measurements from symbols or slots configured for and not configured for the type of duplexing method, the method may include, at 590, determining the CSI based on the first CSI-RS and reporting the CSI to the network.

According to certain embodiments, the method may include receiving timing information, such as a time domain pattern and/or a time offset for indicating when the first set of symbols or slots that is not configured for the type of duplexing method and/or the second set of symbols or slots that is configured for the type of duplexing method would apply. In other words, according to an embodiment, the time offset may be a time period for which the indication, which indicates the first set of symbols or slots and the second set of symbols or slots, would apply. In some embodiments, the determined CSI may include one or more of channel quality information (CQI), precoding matrix indicator (PMI), rank indicator (RI), or layer 1 (L1)-reference signal received power (RSRP).

Representative Precoding Resource Block Group (PRG)-Based UE Procedures/Behaviors According to the DPA Indications In certain examples, a UE may receive a size of a PRG based on one or more of the DCI, a MAC-CE, and/or the RRC. For example, a mode of operation for a DPA indication (e.g., based on the information contents indicating a parameter and/or value representing an amount of DPA) may be based on the PRG indication. For example, if a UE is indicated with a first PRG value (e.g., 2 or 4), the UE may determine to use (e.g., apply) the DPA, for example in accordance with at least one behavior/procedure based on a DPA indication. If the UE is indicated with a second PRG value (e.g., associated with wideband), the UE may determine to use (e.g., apply) a second DL power related behavior/procedure (e.g., based on a fixed power allocation).

For example, a DPA indication based on the information contents indicating a parameter and/or value representing an amount of DPA (for example being applied on one or more DL symbols/signals/channels) may vary (e.g., be dynamic, signaled and/or indicated) based on at least one of the following: (1) the PRG; (2) Per group of one or more PRGs; and/or (3) per PRB bundle (e.g., using PRB-bundling in a size-wise manner, PRB-bundling size wise, etc.).

In certain embodiments, a UE may receive information indicating and/or determine a set of DPA configurations to apply for PDSCH reception based on an indicated PRG. For example, the UE may receive information indicating a set of DPA configurations associated with one or more PRGs (e.g., each PRG). Based on the set of DPA configurations, the UE may determine a set of DPA configurations to apply for PDSCH reception. For example, if the UE receives an indication/value (e.g., 2) associated with a first PRG, the UE may determine a first set of DPA configurations associated with the indicated value for the first PRG. If the UE receives an indication/value associated with a second PRG (e.g., 4), the UE may determine a second set of DPA configurations associated with the indicated value for the second PRG.

In various embodiments, a UE may determine a PRG based on a DPA indication. If the UE is indicated to receive a PDSCH without power adjustment, the UE may use the indicated value of the PRG for the PDSCH reception. If the UE is indicated to receive a PDSCH with the DPA, the UE may determine a PRG for the PDSCH reception based on one or more of following: (1) if the indicated value of the PRG is a first value of the PRG (e.g., 2 or 4), the UE may use a corresponding PRG for the PDSCH reception. (2) if the indicated value of the PRG is a second value of the PRG (e.g., as 'wideband', or associated with wideband, etc.), the UE may use a default PRG for the PDSCH reception (for example the default PRG may be 2 PRBs or 4 PRBs and/or the default PRG may be based on one or more of: (i) a predefined value and/or (ii) a base station/gNB configured value.

Representative UE Measurement Procedures/Behaviors Based on DPA Indications

The following may enable a UE to perform accurate measurements of a signal such as CSI-RS, SSB and/or PRS when DL power adjustment may be applied on such a signal or on at least one occasion of the signal. The purpose of the measurements/outcome from the measurements may include at least one of: (1) CSI reporting, (2) tracking, (3) measurement determinations such as RSRP or RSRQ, (4) beam failure monitoring, (5) radio link monitoring and/or (6) positioning. An occasion (or instance) of a signal may consist of a subset of the signal within a certain time period and/or frequency range, e.g., when such a signal is recurring periodically. Such a signal may be referred to as DL RS in the following.

In some examples, a UE may determine that a DL power adjustment is applied to a signal or an occasion thereof. Such a DL power adjustment may correspond to at least one of the following: (1) a difference and/or an offset between a configured reference transmission power and a transmission power that the UE determines/estimates/assumes for the DL RS occasion, for example when the UE estimates a path loss; and/or (2) a difference and/or an offset between the determined/estimated/assumed transmitted power for a DL RS and another signal or channel such as the PDSCH or the DM-RS, for example when the UE calculates CSI.

The UE may determine a DL power adjustment applicable to a DL RS occasion using at least one of the following. The UE may receive signaling indicating an explicit DL power adjustment for a DL RS occasion. For example, the UE may receive such signaling from a MAC CE activating semi-persistent CSI-RS on the PUCCH or from the DCI activating and/or triggering semi-persistent or aperiodic CSI-RS on the PUSCH. As another example, the UE may receive signaling indicating a DL power adjustment applicable to a time interval such as a set of symbols and/or slots and may apply such a DL power adjustment to DL RS occasions occurring during the time interval. The indication of the DL power adjustment may be derived, for example, from a slot format indication indicating whether the XDD operation is applicable to a time interval. For example, the UE may receive a DPA indication based on the information contents indicating a parameter and/or value representing an amount of DPA (for example being applied on one or more DL symbols/signals/channels). The UE may determine that a DL power adjustment applicable to a DL RS is zero (0) dB if no applicable signaling is received.

The UE may apply and/or may be configured to apply (e.g., perform) at least one of following DL measurement procedures/behaviors (e.g., for the XDD operations):

(1) The UE may apply power-level compensation (for example, the UE may determine a measurement quantity (e.g., CSI) from at least one signal occasion and at least one DL power adjustment applicable to a respective at least one signal occasion. For example, the UE may calculate a CSI from a CSI-RS occasion (e.g., assuming/determining a transmission power offset between this CSI-RS occasion and a PDSCH would correspond to the DL power adjustment). The UE may calculate and may report CSI assuming/determining that the PDSCH would be and/or is to be received with a power that is larger than the received power of the CSI-RS occasion by an amount corresponding to the DL power adjustment. If or on condition that a measurement is determined and/or estimated from more than one DL RS occasion such as at least a first DL RS occasion and a second DL RS occasion, the UE may determine a first measurement value and/or a second measurement value for a first DL RS occasion and the second DL RS occasion by compensating (e.g., emulating) a DL power adjustment applicable to the first and/or second signal occasions. The UE may average the measurements (e.g., the first and second measurement values) to derive the measurement quantity; and/or (2) the UE may apply measurement-skipping. For example, when deriving a measurement quantity (e.g., CSI), the UE may skip measurement of a DL RS on one or more occasions for which there is an applicable DL power adjustment and/or for which such adjustment is not 0 dB. The UE may average (e.g., only average) other measurements derived from other occasions for which there is no applicable DL power adjustment and/or for which such an adjustment is 0 dB to derive a measurement quantity.

Representative Power-Level Compensation Procedure/Behavior

A UE may be configured with one or more periodic and/or semi-persistent DL RS resources, e.g., one or more SSBs, one or more CSI-RS resources for CSI, beam management resources, mobility resources, positioning resources and/or tracking resources. In certain examples, a base station/gNB may configure (e.g., when configuring the periodic and/or semi-persistent DL RSs) a parameter and/or indicator to apply (e.g., selectively apply or not apply) the DPA indication for measurements over the periodic and/or semi-persistent DL RSs.

For example, the parameter and/or indicator (e.g., configured and/or associated with the periodic and/or semi-persistent DL RS) may indicate to apply the DPA indication based on the information contents indicating a parameter and/or value representing an amount of DPA, on any instances (e.g., any times/slots/symbols) of receptions of the periodic and/or semi-persistent DL RSs (e.g., regardless of a slot/symbol type, and/or regardless of whether a slot/symbol corresponds to a XDD slot/symbol or a non-XDD slot/symbol). The parameter/indicator (e.g., configured or associated with the periodic and/or semi-persistent DL RSs) may indicate to apply the DPA indication based on the information contents indicating a parameter and/or value representing an amount of DPA, on certain instances (e.g., only instances/times/slots/symbols) corresponding to specific slot and/or symbol type (e.g., the XDD-slot and/or symbol type).

The parameter and/or indicator (e.g., configured or associated with the periodic and/or semi-persistent DL RSs) may indicate to apply the DPA indication based on the information contents indicating a parameter and/or value representing an amount of DPA, on a particularly indicated one or more instances/times/slots/symbols, e.g., identified/determined by one or more pre-defined or pre-configured time-domain patterns, etc.

When a UE receives (e.g., from a base station/gNB) a DPA indication based on the information contents indicating a parameter and/or value representing an amount of DPA, for example being applied on one or more DL symbols/signals/channels, the UE may apply and/or be configured to apply (e.g., perform) a power-level compensation (e.g., based on the DPA indication) to derive a measurement quantity. In certain examples, the measurement quantity may be one or more of the following: (1) CSI (e.g., a rank indicator (RI), a precoding matrix indicator (PMI), a layer indicator (LI), a CSI-RS Resource Indicator (CRI), an SS/PBCH Resource Block Indicator (SSBRI), Channel Quality Information (CQI), Layer 1 (L1)-RSRP, and/or L1-SINR), (2) one or more beam management reporting quantities (e.g., L1-RSRP, and/or L1-SINR), (3) one or more RRM reporting quantities (e.g., RSRP, RSRQ, layer-3 (L3)-RSRP, and/or L3-RSRQ), e.g., for mobility management, and/or (4) a received signal strength from a PRS for positioning, among others.

In certain examples, for an instance (e.g., every instance) of receiving the periodic and/or semi-persistent DL RSs for which the UE receives, obtains and/or is informed of an DPA indication to apply DPA (e.g., based on the parameter/indicator), the UE may compensate and/or may be configured to compensate the amount of adjusted power based on the DPA indication to make the respective instance comparable to measurements of one or more other instances which do not apply DPA (e.g., have a corresponding DPA indication). After compensation, the UE may average the measurements over the time-domain to derive the measurement quantity.

In various examples, the UE may determine a first measurement value by compensating (e.g., emulating) an amount of adjusted power based on the DPA indication (e.g., on one or more XDD-symbols/slots by measuring the periodic and/or semi-persistent DL RSs) to make the first measurement value comparable to a second measurement value determined on one or more second symbols/slots (e.g., for measuring the same periodic and/or semi-persistent DL RSs which do not have an applied DPA indication). After the compensation, the UE may average the measurements (e.g., the first and second measurement values) over the time-domain to derive a measurement quantity (e.g., a channel measurement part for a CSI, for example, if the measurement quantity corresponds to the CSI). The CSI (e.g., a CQI) may be derived based on the channel measurement part and an interference measurement part, e.g., where the CQI may be derived based on a first power value corresponding to the channel measurement part divided by a second power value corresponding to the interference measurement part.

For example, to derive CSI, the second power value corresponding to the interference measurement part (e.g., based on measuring one or more configured/indicated interference measurement resources) may be determined (e.g., calculated, and/or derived) without applying the DPA indication on any instances (e.g., any times/slots/symbols) configured/indicated for performing/calculating the interference measurement part (e.g., which may be different from performing/calculating the channel measurement part when the DPA indication is applied). Informing the UE of the DPA indication may provide benefits at least in terms of UE complexity reduction and increased robustness for deriving CSI. The UE may be able to compensate the amount of adjusted power based on the DPA indication for the channel measurement part and use the one or more compensated measurements to average with other measurements for the channel measurement part over the time-domain.

Representative Measurement-Skipping Procedure/Behavior

A UE may be configured with periodic and/or semi-persistent DL RS resources, e.g., one or more SSB resources, one or more CSI-RS resources for CSI, one or more beam management resources, one or more mobility resources, and/or one or more tracking resources. In some examples, a base station/gNB may configure (e.g., when configuring periodic and/or semi-persistent DL RSs) a second parameter and/or indicator for a measurement-skipping procedure/behavior to apply or not apply (e.g., selectively apply) the DPA indication for measurements over the periodic and/or semi-persistent DL RSs. For example, the second parameter and/or indicator (e.g., configured or associated with the periodic and/or semi-persistent DL RSs) may indicate to apply the DPA indication based on the information contents indicating a parameter and/or value representing an amount of DPA, on specific instances (e.g., only instances/times/slots/symbols) corresponding to specific slot/symbol type (e.g., the XDD-slot/symbol type), e.g., in terms of the measurement-skipping procedure/behavior. The second parameter and/or indicator (e.g., configured or associated with the periodic and/or semi-persistent DL RSs) may indicate to apply the DPA indication based on the information contents indicating a parameter and/or value representing an amount of DPA, on one or more particularly indicated instances/times/slots/symbols), e.g., identified/determined by one or more pre-defined or pre-configured time-domain patterns, etc., e.g., in terms of the measurement-skipping procedure/behavior.

When a UE receives (e.g., from a base station/gNB) a DPA indication based on the information contents indicating a parameter and/or value representing an amount of DPA (e.g., being applied on one or more DL symbols/signals/channels), the UE may apply and/or be configured to apply (e.g., perform) a measurement-skipping procedure behavior based on the DPA indication on one or more symbols/slots (e.g., corresponding to the DPA indication, and/or when the one or more symbols/slots are determined as XDD-symbols/slots, etc.) to derive a measurement quantity. In some examples, the measurement quantity may be one or more of the following: (1) CSI (e.g., an RI, a PMI, a LI, a CRI, a SSBRI, CQI, L1-RSRP, and/or L1-SINR), (2) one or more beam management reporting quantities (e.g., L1-RSRP, and/or L1-SINR), and/or (3) one or more RRM reporting quantities (e.g., RSRP, RSRQ, L3-RSRP, and/or L3-RSRQ), e.g., for mobility management, among others.

In various examples, for one or more instances of receiving the periodic and/or semi-persistent DL RSs for which the UE receives, obtains and/or is informed to apply scaling and/or compensation based on the DPA indication (e.g., based on the second parameter/indicator), the UE may skip and/or be configured to skip measurement of the DL RSs on the one or more instances and may average (e.g., only average) one or more other measurements derived from one or more other instances for which the DPA indication in not applied over a time-domain, for example to derive the measurement quantity.

Informing the UE of the DPA indication may provide benefits at least in terms of UE complexity reduction and increased robustness for deriving the measurement quantity based on selective averaging over the time-domain according to the measurement-skipping procedure/behavior.

Representative Measurement Restriction Procedures/Behaviors Based on the DPA Indications A UE may be configured with one or more periodic and/or semi-persistent DL RS resources, e.g., one or more SSB resources, one or more CSI-RS resources for CSI, one or more beam management resources, one or more mobility resources, and/or one or more tracking resources, among others. The UE may be configured with a parameter for measurement restriction (MR) (e.g., timeRestrictionForChannelMeasurements), for example that may be associated with the one or more periodic and/or semi-persistent DL RS resources.

For example, when the parameter for MR indicates and/or is configured/set to be a first value (e.g., corresponding to 'ON'), the UE may apply a single (e.g., one-shot) measurement value by measuring the DL RS of a single instance, time, slot and/or symbol to derive one or more measurement quantity (e.g., CSI, CQI, RSRP, SINR, L1-RSRP, L1-SINR, and/or RSRQ, etc.) without applying a time-domain averaging. In certain examples, a single measurement value may be a measurement value derived by measuring the DL RSs on the most recent instance, time, slot and/or symbol.

When the parameter for MR indicates and/or is configured/set to be a second value (e.g., corresponding to 'OFF'), the UE may apply a time-domain averaging by measuring the DL RSs and averaging multiple measurements values measured on one or more instances, times, slots and/or symbols to derive a measurement quantity (e.g., CSI, CQI, RSRP, SINR, L1-RSRP, L1-SINR, and/or RSRQ, etc.).

When a UE receives (e.g., from a base station/gNB) a DPA indication based on the information contents indicating a parameter and/or value representing an amount of DPA (e.g., being applied on one or more DL symbols/signals/channels), the UE may apply (e.g., automatically apply) the MR as 'ON', regardless of a value of the parameter for MR (configured/indicated/associated with the DL RSs).

If a value of the parameter for MR (e.g., configured/indicated/associated with the DL RSs) is set to 'OFF' and when the DPA indication is obtained by a dynamic signaling (e.g., via DCI), the UE may apply and/or be configured to apply (e.g., only apply) the procedure/behavior associated with MR='ON' on a single instance of a reporting (e.g., CSI reporting) based on the obtained DPA indication. After reporting, the UE may apply and/or fallback to apply MR='OFF' based on the parameter for MR. In certain examples, the UE may reset and/or be configured to reset an averaging time-domain window along with applying MR='OFF' (e.g., as the fallback). The resetting of the averaging time-domain window may provide benefits such as, but not limited to, improving accuracy and latency performance based on efficient control of the base station/gNB managing the UE behavior/procedure of a starting time instance for the averaging time-domain window.

In other examples, a MR configuration may be restricted or limited based on the use of the DPA. For example, if the DPA indication is enabled for a BWP, a cell, or a UE (e.g., (1) the DPA indication is supported and (2) (i) the DPA indication field is enabled in a DCI format, and/or (ii) implicit DPA is enabled and/or activated), the MR may be restricted or limited to the 'ON' status. Otherwise, the MR may be configured and/or set either to 'OFF' or 'ON'. One or more of following may apply: (1) a UE may receive information indicating one or more MR configurations for a CSI reporting, for example when the DPA indication is disabled, and the UE may perform one or more measurements based on at least one of the indicated MR configurations; (2) the UE may receive information indicating one or more MR configurations for a CSI reporting, for example when DPA indication is enabled, and the UE may perform one or more measurements based on the assumption/determination that MR='ON' (e.g., MR is set to be on); and/or (3) a UE may not expect to receive information indicating one or more MR configurations for a CSI reporting when the DPA indication is enabled, and the UE may perform one or more measurements based on the assumption/determination that MR='ON', among others.

In certain examples, one or more CSI reporting configurations may be restricted or limited to trigger in a slot based on one or more predefined and/or signaled conditions. For example, a CSI reporting configuration which include MR='OFF' may be restricted, not allowed, and/or not expected to trigger when a DPA level exceeds a threshold (e.g., is lower or higher than a threshold). Alternatively, a CSI reporting configuration which include MR='OFF' may be restricted, not allowed, and/or not expected to trigger when the DPA level is not a default DPA level (e.g., 0 dB). One or more of following may apply: (1) a default DPA level may be used and may refer to no DL power adjustment (e.g., to generate full DL power); (2) one or more DPA levels may be used (e.g., additionally used) to indicate how much DL power is adjusted from the default DPA level (e.g., −1 dB, −2 dB, −3 dB, etc.); and/or (3) a UE may not expect to receive a CSI reporting triggering where a measurement reference signal associated with the CSI reporting triggering is received in the slot for which the indicated DPA level is lower/higher than a threshold or different from a default DPA level.

In other examples, a UE may determine an MR level and/or status (e.g., whether MR='ON' or MR='OFF') for a triggered CSI reporting configuration (e.g., CSI reporting configuration identity) based on the DPA level of previously measured reference signals and/or current measurement reference signals associated with the triggered CSI reporting. For example, when the indicated DPA level for the previously measured one or more reference signals associated with the triggered CSI reporting configuration is the same as the indicated DPA level for the current measurement reference signals, the UE may determine that the MR is set to off (e.g., MR='OFF'), e.g., when the configured MR for the CSI reporting configuration is set to off (e.g., MR='OFF'). One or more of following may apply: (1) a UE may assume/determine that the measurement reference signals with the same DPA level may be used for MR='OFF'; (2) a UE may determine that is on or off (e.g., MR='ON' or 'OFF') for a CSI reporting triggered based on at least one of: (i) an MR configuration for the CSI reporting configuration (e.g., CSI reporting configuration identity) or (ii) the DPA level of previously measured reference signals for the same CSI reporting configuration (e.g., CSI reporting configuration identity).

Representative DPA-Based UE Reporting Procedure in Relation to Legacy Reporting Settings In some examples, a first reporting based on the measurement quantity (e.g., CSI, CQI, RSRP, SINR, L1-RSRP, L1-SINR, and/or RSRQ, etc.) derived based on at least one representative procedure disclosed herein (e.g., the power-level compensation procedure/behavior, the measurement-skipping procedure/behavior, and/or one or more XDD-related operations) may be independently and/or separately performed (e.g., conducted, reported, and/or transmitted) by a UE from a second reporting based on one or more existing/legacy reporting mechanisms/procedures.

For example, the UE may be configured with and/or an indication may be sent (e.g., from a base station/gNB) with multiple, separate reporting settings (e.g., based on multiple separate parameters of CSI-ReportConfig). One of the multiple, separate reporting settings may correspond to (e.g., be used for) the first reporting and another one of the multiple, separate reporting settings may correspond to (e.g., be used for) the second reporting.

The UE may report and/or may be configured to report a first CSI derived based on the first reporting based on at least one procedure disclosed herein (e.g., a power-level compensation procedure/behavior, a measurement-skipping procedure/behavior, and/or one or more XDD-related operations). The UE may report and/or may be configured to report a second CSI derived based on the second reporting based on one or more existing/legacy reporting mechanisms/procedures.

One or more first measurement samples (e.g., based on one or more DL RSs, e.g., CSI-RSs) used for deriving the first CSI and one or more second measurement samples (e.g., based on one or more DL RSs, e.g., CSI-RSs) used for deriving the second CSI may be disjoint (e.g., not overlapping in the time-domain).

In some examples, the one or more first measurement samples used for deriving the first CSI and the one or more second measurement samples used for deriving the second CSI may be overlapped (e.g., partially overlapped) in the time-domain, based on (e.g., depending on) one or more configurations/indications sent/indicated from the base station/gNB, for example which may provide benefits in terms of increasing flexibility in reporting configurations sent/indicated from the base station/gNB perspective.

In certain examples, the first CSI and the second CSI may be reported and/or may be configured/indicated to be reported simultaneously and/or concurrently, e.g., at the same time via a same UL channel (e.g., the PUCCH, or the PUSCH, etc.). In other examples, the first CSI and the second CSI may be reported and/or may be configured/indicated to be reported separately and/or independently, e.g., via separate and/or independent UL channels.

Measurement resources (e.g., CSI-RS resource(s), SSB index(es), etc.) may be separately configured (for the multiple separated reporting settings), where one or more first measurement resources of the measurement resources are used for deriving the first CSI, and one or more second measurement resources of the measurement resources are used for deriving the second CSI.

In certain representative examples, the UE may be configured (e.g., using information from a base station/gNB) with a single (e.g., unified and/or common) reporting setting (e.g., based on the CSI-ReportConfig), for example which may correspond to (e.g., be used for) both the first reporting and the second reporting.

The UE may report and/or be configured to report, via the single reporting setting, both a first CSI derived based on the first reporting based on at least one procedure disclosed herein (e.g., the power-level compensation procedure/behavior, the measurement-skipping procedure/behavior, and/or one or more XDD-related operations) and a second CSI derived based on the second reporting based on one or more existing/legacy reporting mechanisms/procedures. The first CSI may be derived based on a first measurement condition (e.g., measurements restricted in a certain/pre-defined/pre-configured time and/or frequency window and/or pattern and/or one or more XDD-related configurations/indications). The second CSI may be derived based on a second measurement condition (e.g., measurements restricted in a certain/pre-defined/pre-configured time and/or frequency window and/or pattern and/or one or more non-XDD-related configurations/indications).

In some examples, the single (e.g., unified and/or common) reporting setting may include and/or use a selection parameter informing/indicating to the UE to derive a first CSI based on the first reporting which may be based on at least one procedure/behavior (e.g., the power-level compensation procedure/behavior, the measurement-skipping procedure/behavior, and/or one or more XDD-related operations) or a second CSI based on the second reporting based on one or more existing/legacy reporting mechanisms/procedures. For example, the selection parameter may not be included in the single reporting setting and may be indicated (e.g., for a configuration) explicitly or implicitly to the UE whether the single reporting setting is to be used for deriving either the first CSI or the second CSI. For example, the selection parameter may be implicitly indicated based on at least one of one or more XDD-related parameters, behaviors and/or modes. When a given and/or specific slot/symbol corresponds to a XDD slot/symbol (e.g., based on the slot/symbol-type indication for the XDD, the tdd-UL-DL-config parameter for the XDD, the DPA indication, and/or one or more FD-related parameters), the given/specific slot/symbol may be used for deriving the first CSI based on the single reporting setting. When a given/specific slot/symbol corresponds to a non-XDD slot/symbol (e.g., based on the slot/symbol-type indication for the XDD, the tdd-UL-DL-config parameter for the XDD, the DPA indication, and/or one or more FD-related parameters), the given/specific slot/symbol may be used for deriving the second CSI based on the single reporting setting.

In certain examples, measurement resources (e.g., one or more CSI-RS resources, and/or one or more SSB indexes, etc.) may be commonly configured (for the single reporting settings), and a selection parameter may be explicitly or implicitly informed/indicated to the UE to derive a first CSI based on the first reporting which may be based on at least one procedure/behavior disclosed herein (e.g., the power-level compensation procedure/behavior, the measurement-skipping procedure/behavior, and/or one or more XDD-related operations) and/or a second CSI based on the second reporting based on one or more existing/legacy reporting mechanisms/procedures.

For example, the selection parameter may be implicitly indicated based on at least one of one or more XDD-related parameters/behaviors/modes. When a given/specific slot/symbol corresponds to a XDD slot/symbol (e.g., based on the slot/symbol-type indication for the XDD, the tdd-UL-DL-config parameter for the XDD, the DPA indication, and/or one or more FD-related parameters), the given/specific slot/symbol may be used to derive the first CSI based on measuring one or more measurement resources (e.g., one or more commonly configured measurement resources) associated with the given/specific slot/symbol, based on the single reporting setting. For example, when the given/specific slot/symbol corresponds to a non-XDD slot/symbol (e.g., based on the slot/symbol-type indication for XDD, the tdd-UL-DL-config parameter for the XDD, the DPA indication, and/or one or more FD-related parameters), the given/specific slot/symbol may be used to derive the second CSI based on measuring the measurement resources (e.g., commonly configured measurement resources) associated with the given/specific slot/symbol, based on the single reporting setting.

Representative Wideband Reporting Procedures/Behaviors Based on DPA Indications

A UE may receive an indication (and/or a configuration) of CSI/beam reporting (e.g., based on CSI-ReportConfig) which may indicate (e.g., include) at least one of: (1) wideband reporting, (2) sub-band reporting, (3) one or more measurement resources, e.g., one or more CSI-RS resources, one or more SSB indexes, and/or one or more CSI-Interference Management (IM) resources, etc.

A first measurement resource of the one or more measurement resources may be indicated (e.g., included, and/or associated) with a first frequency-domain resource allocation information content (e.g., a first one or more RBs) by which the first measurement resource is transmitted (from a base station/gNB) and received and/or measured by the UE.

When a slot/symbol on which the first measurement resource is transmitted corresponds to a XDD slot/symbol (e.g., based on the slot/symbol-type indication for the XDD, the tdd-UL-DL-config parameter for the XDD, the DPA indication, and/or one or more FD-related parameters), the UE may determine and/or may be indicated/configured to determine (e.g., identify, assume, and/or apply) a second frequency-domain resource allocation information content (e.g., a second one or more RBs) within which the UE may measure, for the slot/symbol, the first measurement resource for the CSI/beam reporting. In some examples, the second one or more RBs may be determined based the slot/symbol-type indication for the XDD of one or more indicated DL RBs.

In certain examples, the second one or more RBs may be included in (e.g., may be a subset of) the first one or more RBs, which may mean (e.g., imply, be interpreted such that) the first measurement resource is truncated (e.g., shortened, and/or partially measured, etc.), for the slot/symbol, as the second one or more RBs being measured by the UE (instead of being measured based on the first one or more RBs). The base station/gNB may transmit, using the slot/symbol, the first measurement resource over the second one or more RBs (and, for example, not over the first one or more RBs) by applying a truncation (e.g., puncturing, and/or shortening, etc.) on the first one or more RBs to transmit (e.g., only transmit) the first measurement resource over the second one or more RBs of the slot/symbol. This may provide benefits to improve resource utilization efficiency in that a third one or more RBs (e.g., out of the first one or more RBs) over which the first measurement resource is not transmitted (e.g., by the truncation) may be utilized and/or reused for other purpose of wireless communications. The base station/gNB may allow the UE (e.g., by an indication, and/or by signaling) to average measurement values/estimates obtained over some RBs (e.g., as a part of the second one or more RBs to which the DPA indication does not apply and/or the slot/symbol-type indication for the XDD does not apply). This may provide benefits in terms of resource utilization flexibility and network operation flexibility/efficiency.

In some examples, a UE may assume (e.g., identify and/or determine) a configured CSI-RS of the one or more measurement resources (e.g., at least for wideband reporting) may be truncated in the frequency-domain when a symbol/slot over which the one or more CSI-RSs are transmitted is indicated as being an XDD-symbol/slot (e.g., based on the slot/symbol-type indication for the XDD, the tdd-UL-DL-config parameter for the XDD, the DPA indication, and/or one or more FD-related parameters). The UE may measure the CSI-RSs of the truncated frequency region (e.g., only the truncated frequency region), e.g., for measurement averaging to derive CSI (e.g., wideband CSI).

For example, the base station/gNB may allow the UE (e.g., by an indication and/or by signaling) to average measurement values/estimates (which are obtained using one or more XDD symbols/slots and/or using one or more non-XDD symbols/slots, e.g., where both slot types may be allowed for averaging together) over time to derive a wideband CQI/CSI. In some examples, the base station/gNB may indicate that the UE is to skip the truncated measurements for averaging over time to derive the wideband CQI/CSI, which may provide benefits in terms of improving accuracy of measurement averaging which may not be affected by the truncated measurements based on an efficient network operation strategy.

A UE may determine (e.g., identify and/or assume) transmission of a configured CSI-RS of one or more measurement resources (e.g., at least for wideband reporting) may be skipped for a symbol/slot indicated as being an XDD-symbol/slot (e.g., based on the slot/symbol-type indication for the XDD, the tdd-UL-DL-config parameter for the XDD, the DPA indication, and/or one or more FD-related parameters). In response to the determination or after the determination, the UE may not receive and/or measure the CSI-RS on the symbol/slot, e.g., for measurement averaging to derive the CSI (e.g., wideband CSI).

Representative Sub-Band Reporting Procedures/Behaviors Based on DPA Indications

A UE may receive an indication and/or information associated with a configuration of CSI/beam reporting (e.g., based on CSI-ReportConfig) which may indicate (e.g., include) at least one of: (1) wideband reporting, (2) sub-band reporting, and/or (3) one or more measurement resources, e.g., one or more CSI-RS resources, one or more SSB indexes, and/or one or more CSI-IM resources, etc.

At least one representative procedure for UE reporting herein may be at least applicable for wideband reporting, e.g., when configured and/or when indicated from a base station/gNB. For example, when the UE is configured with and/or indicated to use sub-band reporting (e.g., in addition and/or in lieu of wideband reporting), the UE may skip and/or may be configured to skip reporting for one or more particular sub-bands which may be configured, indicated and/or associated (e.g., at least partially configured/indicated/associated) with an XDD-related parameter (e.g., the DPA indication, a DL sub-band-wise muting indication, and/or an XDD-related slot/symbol-type, etc.).

For example, if or on condition that a first sub-band is configured/indicated/associated with the XDD-related parameter, if the parameter is indicated for a sub-band-level (e.g., for a part of RBs in a BWP/CC, for example when the DPA indication (e.g., based on the measurement-skipping procedure/behavior) is given/obtained per group of RBs, the UE may skip reporting a first CSI (e.g., sub-band-CSI) corresponding to the first sub-band, when reporting the configured/indicated sub-band reporting (e.g., in addition to the wideband reporting).

In other examples, if a second sub-band is not configured/indicated/associated with the XDD-related parameter, the UE may not skip reporting (and may include for the sub-band reporting) a second CSI (e.g., sub-band-CSI) corresponding to the second sub-band, when reporting the configured/indicated sub-band reporting (e.g., in addition to the wideband reporting).

In various examples, if the UE is configured/indicated to report the sub-band reporting on 4 sub-bands (e.g., that may include a first sub-band, a second sub-band, a third subband, and a fourth sub-band) and if the third sub-band and the fourth sub-band are all not configured/indicated/associated with the XDD-related parameter, the UE may report the sub-band reporting which may include the second sub-band-CSI, the third sub-band-CSI (e.g., derived based on the third sub-band), and the fourth sub-band-CSI (derived based on the fourth sub-band), but the first sub-band-CSI may be skipped (e.g., may not be reported to the base station/gNB).

In certain representative embodiments, when the UE is configured with and/or indicated to use sub-band reporting (e.g., in addition to or in lieu of wideband reporting), the UE may apply and/or may be configured to apply (e.g., perform) a sub-band-wise power-level compensation procedure/behavior, e.g., a sub-band-by-sub-band independent power level compensation for one or more particular sub-bands which may be configured/indicated/associated (e.g., at least partially configured/indicated/associated) with a XDD-related parameter (e.g., the DPA indication, a parameter informing the UE of performing the power-level compensation to derive a measurement quantity, and/or the XDD-related slot/symbol-type, etc.).

In some examples, if a first sub-band is configured/indicated/associated with the XDD-related parameter, and if the XDD-related parameter is indicated for a sub-band-level (e.g., for a part of the RBs in a BWP/CC, for example when the DPA indication, e.g., based on the power-level compensation) is given/provided per group of RBs, the UE may apply at least one of the procedures herein for the power-level compensation to derive a first CSI (e.g., sub-band-CSI) corresponding to the first sub-band, when reporting the configured/indicated sub-band reporting (e.g., in addition to wideband reporting).

For example, if a second sub-band is not configured/indicated/associated with the XDD-related parameter, the UE may not apply the power-level compensation to derive a second CSI (e.g., sub-band-CSI) corresponding to the second sub-band, when reporting the configured/indicated sub-band reporting (e.g., in addition to wideband reporting).

In some examples, if the UE is configured/indicated to report the sub-band reporting on 4 sub-bands (e.g., including a first sub-band, a second sub-band, a third sub-band, and a fourth sub-band) and if the third sub-band and the fourth sub-band are not configured/indicated/associated with a XDD-related parameter (e.g., and if the first sub-band and the second sub-band are configured/indicated/associated with a XDD-related parameter), the UE may report sub-band reporting including the first sub-band-CSI (e.g., corresponding to the first sub-band) derived based on and/or using the power-level compensation, the second sub-band-CSI CSI (e.g., corresponding to the second sub-band) derived based on and/or using the power-level compensation, the third sub-band-CSI CSI (e.g., corresponding to the third sub-band) derived based on and/or not using the power-level compensation, and/or the fourth sub-band-CSI CSI (e.g., corresponding to the fourth sub-band) derived based on and/or not using the power-level compensation).

Representative CSI Derivation Based on Measuring Other UE's RS

A UE may support CSI reporting for DPA operations. The CSI reporting may be based on one or more of following:

(1) the UE may report CSI reporting with a set of CSI parameters. For example, the UE may indicate its preferred assumption/determination of DPA operations/procedures. For example, if the UE indicates a preference for DPA operations/procedures, the UE may report a set of CSI parameters derived based on use of DPA operations/procedures. If the UE indicates a preference not to use DPA operations/procedures, the UE may report a set of CSI parameters derived based on no DPA operations/procedures. For example, the indication may be explicit or implicit. As an example of an explicit indication, a parameter with a first value (e.g., '0') may indicate no DPA operations/procedures and a second value (e.g., '1') may indicate DPA operations/procedures. In another example, the indication may be implicit. For example, the UE may report an index/information associated with one or more of: (1) one or more CSI-RS resources/resource set configurations, (2) SSB configurations and/or (3) CSI report configurations. The UE may indicate an associated configuration based on the index. For example, if the associated configuration includes an indication of the use of one or more DPA operations/procedures, the UE may derive the set of CSI parameters using one or more DPA operations/procedures. If the associated configuration does not include an indication of the use of DPA operations/procedures or includes no indication of DPA operations/procedures, the UE may derive the set of CSI parameters using no DPA operations/procedures. For example, the index may be one or more of: one or more CSI-RS resources/resource set indexes, one or more SSB indexes and/or one or more CSI report config indexes; and/or (2) the UE may report CSI reporting with two or more sets of CSI parameters. For example, the CSI reporting may include a first set of CSI parameters and a second set of CSI parameters. The UE may derive the first set of CSI parameters using no DPA operations/procedures and the second set of CSI parameters using one or more DPA operations/procedures. The UE may receive information indicating a CSI reporting configuration for measuring interference based on DMRSs (e.g., UL DMRSs) and/or SRSs. The UE may be configured with/indicated to use an independent Timing Advance (TA) to measure the DMRSs and/or the SRSs. The UE may apply a measured TA for interference measurement based on the configuration of the DMRSs and/or the SRSs.

For example, the UE may derive and/or may be configured to derive a CSI based on measuring at least one UL RS (e.g., one or more UL RSs configured to other UEs in the cell, e.g., taking UE-to-UE CLI mitigation into account). The UE may be configured/indicated to derive a CSI, by measuring configured/indicated DL-RSs (as the desired RSs) and/or (other UE's) UL DMRSs (e.g., and/or SRSs) (for example as interference), e.g., for accommodating UE-to-UE CLI. The UE may report and/or may be configured to report a first CSI (e.g., without FD, XDD, and/or DPA) and/or a second CSI (e.g., with FD, XDD, and/or DPA). The DL-RSs (e.g., CSI-RSs) may be applied with the DPA (e.g., depending on conditions/criteria).

Representative Power Ratio Between RSs Based on DPA Indications

A UE may derive CSI based on the indicated DPA. For example, the UE may determine a power offset of PDSCH RE to CSI-RS RE based on the indicated DPA. For example, the UE may be configured with a set of powerControlOffsets (e.g., per CSI-RS resource and/or per SSB). If the UE receives an indication indicating a first DPA value, the UE may determine a first powerControlOffset of the set associated with the first DPA value. If the UE receives an indication indicating a second DPA value, the UE may determine a second powerControlOffset of the set associated with the second DPA value. In some examples, the UE may be configured with a powerControlOffset and a set of delta powerControlOffsets (e.g., per CSI-RS resource and/or per SSB). If the UE receives an indication indicating a first DPA value, the UE may apply the powerControlOffset plus or minus a first delta powerControlOffset of the set associated with the first DPA value. If the UE receives an indication indicating a second DPA value, the UE may apply the powerControlOffset plus or minus a second delta powerControlOffset of the set associated with the second DPA value. An association between a power offset/delta power offset and CSI-RS/SSB may be based on one or more of: RRC (e.g., RRC signaling), a MAC CE and/or DCI. For example, the procedure (e.g., the association procedure) may be different based on a transmission type. For example, for a first type of CSI-RS/SSB (e.g., periodic and/or semi-persistent), the UE may be configured with the association via the RRC. For a second type of CSI-RS/SSB (e.g., semi-persistent and/or aperiodic), the UE may be configured with the association via a dynamic indication (e.g., a MAC CE and/or DCI).

In some examples, the UE may receive the dynamic indication of powerControlOffset or delta powerControlOffset for CSI reporting. The indication may be based on an explicit DCI field. In other examples, the indication may be based on an association between indicated, triggered and/or configured CSI reporting configurations. For example, powerControlOffset or delta powerControlOffset may be configured in a CSI reporting configuration. If a CSI reporting configuration is indicated/triggered/configured, the UE may apply an associated powerControlOffset or delta powerControlOffset to one or more associated CSI-RS resources/resource sets.

In certain representative embodiments, a UE may determine a power ratio between different RSs and/or channels based on a DPA indication. The different RSs and/or channels may be one or more of the following: (1) DL/UL, DMRS, (2) DL/UL PT-RS, (3) PDCCH, (4) PDSCH, (5) PUCCH, (6) PUSCH, (7) SSB, (8) CSI-RS, (9) SRS, and/or (10) TRS (i.e., CSI-RS for tracking), among others.

For example, the UE may determine a power ratio between DMRSs based on a DPA indication. The UE may determine a power ratio between different RSs/channels, e.g., a DMRS or CRS-to-PDSCH EPRE ratio, based on a DPA indication. The power ratio may be determined as a first value when an indicated value by the DPA indication is below a pre-defined and/or pre-configured threshold. The power ratio may be determined as a second value, when an indicated value by the DPA indication is above the pre-defined and/or pre-configured threshold.

Representative UE-Triggered Automatic Gain Control (AGC) Procedure Based on DPA Indications A UE may perform automatic gain control (AGC) for a certain period before the reception of a signal (e.g., a DL signal). A time window in which the UE may perform AGC may be referred to as a AGC time window. The AGC time window may be interchangeably used with AGC symbol, AGC signal, AGC slot, and/or AGC sample.

A first part of a DL channel which is associated with a DPA indication may be used as a AGC time window when one or more of conditions are met. For example, a first symbol of a PDSCH may be used as a AGC time window when a gap between the DPA level for the PDSCH and the DPA level of the previously received PDSCH is greater than a threshold. In certain examples, a first symbol of a PDSCH may be used as a AGC time window when the gap between the DPA level of the scheduled PDSCH and the DPA level of a reference DL channel (e.g., an associated PDCCH) is greater than a threshold. One or more of the following may apply:

(1) a UE may determine the presence of an AGC time window for a DL channel reception based on a gap between a first DPA level and a second DPA level. For example, the first DPA level may be associated with a first DL channel and the second DPA level may be associated with a second DL channel. The first DL channel may be scheduled and/or configured, which the UE may decode, attempt to decode, monitor, and/or receive in a current slot or in a later slot. The first DL channel may include at least one of: a PDCCH, a Physical Sidelink Control Channel (PSCCH), a Physical Sidelink Shared Channel (PSSCH) and/or a PDSCH, among others. The second DL channel may be a DL channel scheduled and/or received earlier than the first DL channel. The second DL channel may include at least one of: SSB, CSI-RS, PDCCH, PSCCH, PSSCH, and/or PDSCH. When an AGC time window is present, a UE may perform (de) puncturing and/or (de) rate-matching of the REs in the first DL channel which may overlap with the AGC time window. The AGC time window may be at least one of following: (i) a copy of the first N symbol of the first DL channel; (ii) a copy of one or more reference signals (e.g., a first reference signal symbol) of the first DL channel; and/or (iii) a predetermined sequence (e.g., the CSI-RSs, and/or the TRSs, among others);

(2) when a same slot scheduling is used (e.g., scheduled PDSCH and its associated PDCCH are transmitted/received in the same slot), the reference DL channel/search space to determine the presence of the AGC time window for the scheduled PDSCH may be at least one of the following: (i) the associated PDCCH (e.g., the search space/CORESET, which is used for scheduling PDSCH); (ii) a search space (or CORESET) monitored by the UE and the closest (e.g., earlier in time) to the PDSCH in the same slot; (iii) a search space with the lowest CORESET identity within the slot; (iv) a search space with the lowest search space identity; and/or (v) the last PDSCH received, among others; and/or (3) when a cross slot scheduling is used (e.g., scheduled PDSCH and its associated PDCCH are transmitted/received in a different slot), the reference DL channel/search space to determine the presence of the AGC time window may be at least one of following: (i) the associated PDCCH; (ii) a search space (or CORESET) monitored by the UE and closest (e.g., earlier in time) to the scheduled PDSCH in either the same slot or an earlier slot; (iii) a search space with the lowest CORESET identity in a closest slot including the same slot (e.g., earlier in time) to the scheduled PDSCH; and/or (iv) a last PDSCH received.

In certain examples, the AGC time window length may be determined based on a gap of the first DPA level and the second DPA level. For example, if the gap is less than a first threshold, a first AGC time window length (e.g., 0 symbols) may be used; if the gap is greater than the first threshold (and/or, for example, less than a second threshold), a second AGC time window length (e.g., 1 symbol) may be used. One or more of following may apply: (1) a UE may determine the presence and/or length of AGC time window for a DL channel based on the gap between the first DPA level and the second DPA level; and/or (2) a UE may indicate its capability for the required/set length of AGC time window based on the gap (e.g., each gap range).

In certain examples, the presence of AGC time window for a DL channel may be implicitly determined based on the DPA indication. For example, a UE may determine no AGC time window for a DL channel if a first DPA level (e.g., 0 dB) is indicated for the DL channel. The UE may determine that a AGC time window is present for the DL channel if a second DPA level (e.g., −3 dB) is indicated for the DL channel.

A UE may determine that AGC time window is present in a DL channel if one of a first subset of DPA levels is indicated for the DL channel and otherwise, the AGC time window may not be present in the DL channel.

In some examples, a UE may receive and/or obtain information indicating a DPA level based on an indication of AGC time window presence in a DL channel. For example, a UE may receive scheduling/configuration information for a DL channel. If the scheduling/configuration information enables an AGC time window, the UE may determine/assume a first DPA level (e.g., −3 dB) and otherwise, the UE may determine/assume a second DPA level (e.g., 0 dB).

In some examples, a UE may report and/or be configured to report (e.g., transmit) a feedback message after performing at least one procedure/behavior disclosed herein based on AGC and/or an AGC time window. The feedback message may include a status on/after applying the AGC and an outcome/result by applying the AGC, etc., e.g., requesting more (or adjusted) AGC symbols and/or AGC time windows, among others.

In certain examples, a UE may not receive and/or may not expect to receive data and/or signal (e.g., DL signals/channels) during the AGC time window. For example, the UE may not receive data (e.g., DL signals/channels) during the AGC time window. The UE may not transmit a UL signal (e.g., an ACK and/or a PUCCH, etc.) in response to/after receiving data (e.g., DL signals/channels) during the AGC time window.

In various examples, a UE may not transmit and/or may not expect to transmit data/signals (e.g., UL signals/channels) during the AGC time window. For example, the UE may not transmit, may ignore transmitting, may skip transmitting, may postpone transmitting data/signals (e.g., UL signals/channels) during the AGC time window, e.g., even though the data/signals had been (e.g., previously) scheduled for transmission.

Each of the contents of the following references is incorporated by reference herein in its entirety: (1) 3GPP TS 38.212, entitled "Multiplexing and channel coding", V16.6.0; (2) 3GPP TS 38.213, entitled "Physical layer procedures for control", V16.6.0; (3) 3GPP TS 38.214, entitled "Physical layer procedures for data", V16.6.0; (4) 3GPP TS 38.321, entitled "Medium Access Control (MAC) protocol specification", V16.5.0; (5) 3GPP TS 38.331, entitled "Radio Resource Control (RRC) protocol specification", V16.5.0; and (6) 3GPP TS 38.215, entitled "Physical layer measurements", V16.4.0.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within a robotic assistance/apparatus (RAA) and/or another mobile device remotely. In the later a case, data may be transferred via wireline or wirelessly between the RAA or other mobile device containing the sensors and the remote device containing the processor which runs the software which performs the scale estimation and compensation as described above. According to other representative embodiments, some of the processing described above with respect to localization may be performed in the device containing the sensors/cameras, while the remainder of the processing may be performed in a second device after receipt of the partially processed data from the device containing the sensors/cameras.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods. It should be understood that the representative embodiments are not limited to the above-mentioned platforms or CPUs and that other platforms and CPUs may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described elsewhere herein; (ii) any of a number of embodiments of a WTRU, such as described elsewhere herein; (iii) a wireless-capable and/or wired-capable (e.g., tetherable) device configured with, inter alia, some or all structures and functionality of a WTRU, such as described elsewhere herein; (iii) a wireless-capable and/or wired-capable device configured with less than all structures and functionality of a WTRU, such as described elsewhere herein; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mate-able and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Throughout the disclosure, one of skill understands that certain representative embodiments may be used in the alternative or in combination with other representative embodiments.

In addition, the methods described herein may be implemented in a computer program, software, or firmware incorporated in a computer readable storage medium as instructions for execution by a computer or processor to perform the actions described hereinabove. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a wireless transmit/receive unit (WTRU), the method comprising:
receiving configuration information indicating a first set of resource blocks (RBs) for performing a channel state information reference signal (CSI-RS) measurement;
receiving an indication indicating a second set of RBs, wherein the second set of RBs are indicated as downlink (DL) RBs, and wherein the second set of RBs comprises a subset of the first set of RBs;
receiving an indication indicating that a first set of symbols or slots is not configured for a type of duplexing method and a second set of symbols or slots is configured for the type of duplexing method;
measuring a first CSI-RS in the first set of RBs in a symbol or slot in the first set of symbols or slots; and
on a condition that the WTRU is to combine CSI-RS measurements from the first set of symbols or slots that are not configured for the type of duplexing method and CSI-RS measurements from the second set of symbols or slots that are configured for the type of duplexing method, the method comprises:
measuring a second CSI-RS in a symbol or slot of the second set of symbols or slots in RBs that are overlapping in both the first set of RBs and the second set of RBs,
determining channel state information (CSI) based on the measurement of the first CSI-RS and the second CSI-RS, and
reporting the CSI.

2. The method of claim 1, comprising:
receiving, from a network node, an indication indicating that the WTRU can combine CSI-RS measurements from symbols or slots not configured for the type of duplexing method and CSI-RS measurements from symbols or slots configured for the type of duplexing method.

3. The method of claim 1, wherein the type of duplexing method comprises any of subband non-overlapping full duplex (SBFD) and cross division duplex (XDD).

4. The method of claim 1, wherein the determining of the CSI based on the measurement of the first CSI-RS and the second CSI-RS comprises averaging the measurements of the first CSI-RS and the second CSI-RS.

5. The method of claim 1, comprising:
receiving timing information comprising any of a time domain pattern and time stamps for indicating when any of (1) the first set of symbols or slots and (2) the second set of symbols or slots apply.

6. The method of claim 1, wherein one or more of the RBs in the second set of RBs are non-contiguous.

7. The method of claim 1, wherein the determined CSI comprises any of channel quality information (CQI), a precoding matrix indicator (PMI), a rank indicator (RI), and a layer 1 (L1)-reference signal received power (RSRP).

8. A wireless transmit/receive unit (WTRU), comprising:
a transceiver configured to:
receive configuration information indicating a first set of resource blocks (RBs) for performing a channel state information reference signal (CSI-RS) measurement;
receive an indication indicating a second set of RBs, wherein the second set of RBs are indicated as downlink (DL) RBs, and wherein the second set of RBs comprises a subset of the first set of RBs; and
receive an indication indicating that a first set of symbols or slots is not configured for a type of duplexing method and a second set of symbols or slots is configured for the type of duplexing method; and
a processor configured to:
measure a first CSI-RS in the first set of RBs in a symbol or slot in the first set of symbols or slots; and
on a condition that the WTRU is to combine CSI-RS measurements from the first set of symbols or slots that are not configured for the type of duplexing method and CSI-RS measurements from the second set of symbols or slots that are configured for the type of duplexing method:
measure a second CSI-RS in a symbol or slot of the second set of symbols or slots in RBs that are overlapping in both the first set of RBs and the second set of RBs,
determine channel state information (CSI) based on the measurement of the first CSI-RS and the second CSI-RS, and
report the CSI.

9. The WTRU of claim 8, wherein the transceiver is configured to receive, from a network node, an indication indicating that the WTRU can combine CSI-RS measurements from symbols or slots not configured for the type of duplexing method and CSI-RS measurements from symbols or slots configured for the type of duplexing method.

10. The WTRU of claim 8, wherein the type of duplexing method comprises any of subband non-overlapping full duplex (SBFD) and cross division duplex (XDD).

11. The WTRU of claim 9, wherein, to determine the CSI based on the measurement of the first CSI-RS and the second CSI-RS, the processor is configured to average the measurements of the first CSI-RS and the second CSI-RS.

12. The WTRU of claim 8, wherein the transceiver is configured to receive timing information comprising any of a time domain pattern and time stamps for indicating when any of (1) the first set of symbols or slots and (2) the second set of symbols or slots apply.

13. The WTRU of claim 8, wherein one or more of the RBs in the second set of RBs are non-contiguous.

14. The WTRU of claim 9, wherein the determined CSI comprises any of channel quality information (CQI), a precoding matrix indicator (PMI), a rank indicator (RI), and a layer 1 (L1)-reference signal received power (RSRP).

15. A wireless transmit/receive unit (WTRU), comprising:
means for receiving configuration information indicating a first set of resource blocks (RBs) for performing a channel state information reference signal (CSI-RS) measurement;
means for receiving an indication indicating a second set of RBs, wherein the second set of RBs are indicated as downlink (DL) RBs, and wherein the second set of RBs comprises a subset of the first set of RBs;
means for receiving an indication indicating that a first set of symbols or slots is not configured for a type of duplexing method and a second set of symbols or slots is configured for the type of duplexing method;
means for measuring a first CSI-RS in the first set of RBs in a symbol or slot in the first set of symbols or slots;
on a condition that the WTRU is to combine CSI-RS measurements from the first set of symbols or slots that are not configured for the type of duplexing method and CSI-RS measurements from the second set of symbols or slots that are configured for the type of duplexing method, the WTRU comprises:

means for measuring a second CSI-RS in a symbol or slot of the second set of symbols or slots in RBs that are overlapping in both the first set of RBs and the second set of RBs, means for determining channel state information (CSI) based on the measurement of the first CSI-RS and the second CSI-RS, and means for reporting the CSI.

16. The WTRU of claim 15, comprising:

means for receiving, from a network node, an indication indicating that the WTRU can combine CSI-RS measurements from symbols or slots not configured for the type of duplexing method and CSI-RS measurements from symbols or slots configured for the type of duplexing method.

17. The WTRU of claim 15, wherein the type of duplexing method comprises any of subband non-overlapping full duplex (SBFD) and cross division duplex (XDD).

18. The WTRU of claim 15, wherein the means for determining the CSI based on the measurement of the first CSI-RS and the second CSI-RS comprises means for averaging the measurements of the first CSI-RS and the second CSI-RS.

19. The WTRU of claim 15, comprising:

means for receiving timing information comprising any of a time domain pattern and time stamps for indicating when any of (1) the first set of symbols or slots and (2) the second set of symbols or slots apply.

20. The WTRU of claim 15, wherein one or more of the RBs in the second set of RBs are non-contiguous.

21. The WTRU of claim 15, wherein the determined CSI comprises any of channel quality information (CQI), a precoding matrix indicator (PMI), a rank indicator (RI), and a layer 1 (L1)-reference signal received power (RSRP).

* * * * *